(12) United States Patent
Sakura et al.

(10) Patent No.: US 10,666,512 B2
(45) Date of Patent: May 26, 2020

(54) CURRENT CONFIGURATION STATE SPECIFIC DEVICE CONFIGURATION

(71) Applicant: Aerohive Networks, Inc., Milpitas, CA (US)

(72) Inventors: Kenshin Sakura, San Francisco, CA (US); Douglas Robert Case, Saratoga, CA (US)

(73) Assignee: Aerohive Networks, Inc., Milpitas, CA (US)

(*) Notice: Subject to any disclaimer, the term of this patent is extended or adjusted under 35 U.S.C. 154(b) by 310 days.

(21) Appl. No.: 15/455,079

(22) Filed: Mar. 9, 2017

(65) Prior Publication Data

US 2018/0262394 A1 Sep. 13, 2018

(51) Int. Cl.
| | | |
|---|---|---|
| *G06F 15/177* | (2006.01) | |
| *H04L 12/24* | (2006.01) | |
| *H04L 29/08* | (2006.01) | |
| *H04L 12/26* | (2006.01) | |
| *H04W 4/70* | (2018.01) | |
| *H04W 4/50* | (2018.01) | |
| *H04W 8/24* | (2009.01) | |
| *H04W 84/12* | (2009.01) | |

(52) U.S. Cl.
CPC ...... *H04L 41/0813* (2013.01); *H04L 41/0846* (2013.01); *H04L 41/0879* (2013.01); *H04L 41/26* (2013.01); *H04L 43/10* (2013.01); *H04L 67/12* (2013.01); *H04W 4/50* (2018.02); *H04W 4/70* (2018.02); *H04W 8/245* (2013.01); *H04L 41/0883* (2013.01); *H04W 84/12* (2013.01)

(58) Field of Classification Search
CPC ............. H04L 41/0813; H04L 41/0846; H04L 41/0879; H04L 41/0883; H04L 41/26; H04L 43/10; H04L 67/12; H04W 4/70; H04W 4/50; H04W 84/12
USPC ....................................................... 709/221
See application file for complete search history.

(56) References Cited

U.S. PATENT DOCUMENTS

| | | | | |
|---|---|---|---|---|
| 6,725,260 B1* | 4/2004 | Philyaw | ................ | G06F 9/4411 709/220 |
| 9,531,618 B2* | 12/2016 | Frei | ...................... | H04L 29/1249 |
| 2008/0280588 A1* | 11/2008 | Roundtree | .......... | G06F 9/45512 455/405 |
| 2017/0214701 A1* | 7/2017 | Hasan | ................. | H04L 63/1408 |
| 2018/0095439 A1* | 4/2018 | Karbasian | .......... | G05B 19/0426 |
| 2018/0375720 A1* | 12/2018 | Yang | ....................... | H04L 29/08 |

OTHER PUBLICATIONS

Calhoun, P. et al., "Control and Provisioning of Wireless Access Points (CAPWAP) Protocol Specification," Request or Comments: 5415 (RFC 5415), Network Working Group, Mar. 2009.

* cited by examiner

*Primary Examiner* — Sm A Rahman
(74) *Attorney, Agent, or Firm* — Sterne, Kessler, Goldstein & Fox P.L.L.C.

(57) ABSTRACT

Systems and methods for configuring a device to operate based on a current configuration state of the device in a manner agnostic to an assumed configuration state of a device. Systems can include a local state aware device manager and a state aware device configuration agnostic mediator. Methods can include locally determining an actual current configuration state of a device in operation, generating desired configuration instructions based on the actual current configuration state of the device, and locally configuring the device to operate according to the desired configuration instructions.

20 Claims, 10 Drawing Sheets

CURRENT CONFIGURATION STATE SPECIFIC DEVICE CONFIGURATION

DETAILED DESCRIPTION

Figure 1:
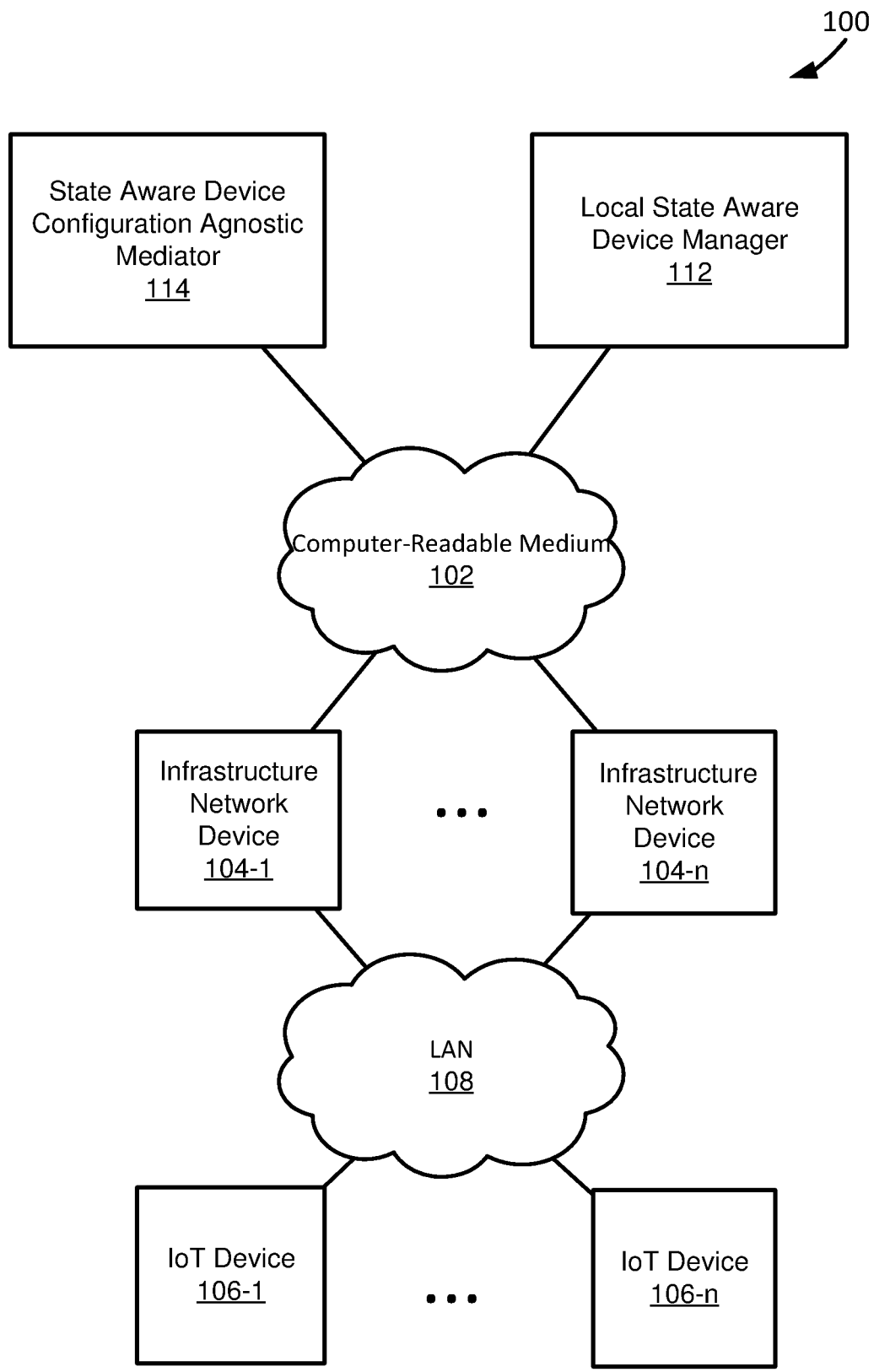
FIG. 1 depicts a diagram of an example of a system for configuring devices based on state.

FIG. 1 depicts a diagram 100 of an example of a system for configuring devices based on state. The system of the example of FIG. 1 includes a computer-readable medium 102, infrastructure network device 104-1 . . . infrastructure network device 104-n (hereinafter referred to as "infrastructure network devices 104"), IoT device 106-1 . . . IoT device 106-n (hereinafter referred to as "IoT devices 106"), a local area network 108 (hereinafter referred to as "LAN 108", a local state aware device manager 112, and a state aware device configuration agnostic mediator 114. In the example system shown in FIG. 1, the IoT devices 106 are operationally coupled to the infrastructure network devices 104 through the LAN 108. While LAN 108 is shown as only one local area network, LAN 108 can include a plurality of separate LANs which operationally couple the IoT devices 106 to the infrastructure network devices 104.

In the example, of FIG. 1, the LAN 108 is intended to represent network that include or are included in a computer-readable medium. The computer-readable medium 102 and other computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 and other computer readable mediums discussed in this paper are intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

Assuming a computer-readable medium includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (hereinafter referred to as "HTTP") for hypertext markup language (hereinafter referred to as "HTML") documents that make up the World Wide Web (hereinafter referred to as "the web"). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

The devices, systems, and computer-readable mediums described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. As used in this paper, edge devices include applicable devices at an edge of one or a combination of a LAN, a WLAN, a consumer network, and an enterprise network. For example, an edge device can be a networking device, at an edge of a LAN, providing wireless access to network services through a WLAN. In another example, an edge device can be an IoT device accessing network services through a LAN. In yet another example, an edge device can be an IoT device transmitting data through at least a portion of a wired connection, e.g. a Universal Serial Bus (hereinafter referred to as "USB") connection. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. That is, the engine includes hardware. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Returning to the example system shown in FIG. 1, the infrastructure network devices 104 are intended to represent devices that send and receive data used in providing access to network services of a network. For example, the multi-protocol infrastructure network devices 104 can provide IoT devices network service access through a LAN. In a specific implementation, the multi-protocol infrastructure network devices 104 receive signals from an IoT device to which the multi-protocol infrastructure network devices 104 may or may not (depending upon implementation-, configuration-, network-, or device-specific considerations) provide access to network services. In another implementation, the multi-protocol infrastructure network devices 104 send signals to an IoT device to which the multi-protocol infrastructure network devices 104 may or may not (depending upon implementation-, configuration-, network-, or device-specific considerations) provide access to network services.

The infrastructure network devices 104 and other network devices described in this paper include or function as routers, switches, access points, gateways, including wireless gateways, repeaters, or a combination thereof. In functioning as gateways, the infrastructure network devices 104 can transmit and receive data between a WAN through a LAN back-end and IoT devices coupled to the infrastructure network devices 104. In functioning as access points, the infrastructure network devices 104 can couple an IoT device to a network device forming a LAN back-end and subsequently a WAN through a LAN. For example, the infrastructure network devices 104 can be used to route data between IoT devices coupled to the infrastructure network devices 104 as part of a personal area network (hereinafter referred to as "PAN") formed, at least in part, by the IoT devices and the multi-protocol infrastructure network devices 104.

In a specific implementation, the infrastructure network devices 104 can function according to applicable wireless communication protocols or standards, e.g. Wi-Fi, ZigBee®, Bluetooth®, applicable low-power communication standards, or applicable wireless PAN communication standards. For example, the infrastructure network devices 104 can be wirelessly coupled to IoT devices through wireless connections established according to a Wi-Fi protocol and subsequently communicate with the IoT devices over the wireless connections according to the Wi-Fi protocol. In another example, the infrastructure network devices 104 can be wirelessly coupled to IoT devices through wireless connections established according to a Bluetooth® protocol and subsequently communicate with the IoT devices over the wireless connections according to the Bluetooth® protocol.

In a specific implementation, the infrastructure network devices 104 function to communicate with IoT devices over a wired connection. Specifically, the infrastructure network devices 104 can be coupled to IoT devices through applicable wired connections and communicate with the IoT devices through the wired connections. For example, the infrastructure network devices 104 can be coupled to an IoT device through a USB connection and receive data generated at the IoT device over the USB connection.

The infrastructure network devices 104 are intended to represent infrastructure network devices capable of providing IoT devices access to network services through wired and wireless connections established and maintained according to different protocols, thereby forming different LANs, e.g. different WLANs. For example, the infrastructure network devices 104 can provide network services access to a first IoT device through a Bluetooth® connection and provide network service access to a second IoT device through a Wi-Fi connection. In providing IoT devices access to network services according to different protocols, the infrastructure network devices 104 can be referred to as multi-protocol infrastructure network devices. Additionally, the infrastructure network devices 104 can simultaneously provide multiple IoT devices access to network services of a network over different wired or wireless connections. For example, the infrastructure network devices 104 can provide network service access to a first IoT device through a Bluetooth® connection and simultaneously provide network service access to a second IoT device through a Wi-Fi connection.

In a specific implementation, in allowing IoT devices to access network services through different LANs, the infrastructure network devices 104 allow IoT devices configured to access network services through the different LANs to communicate with each other over the different LANs. For example, a first IoT device can send data to a unique infrastructure network device through a Bluetooth® based WLAN, and the same or a different unique infrastructure network device can send the data to a second IoT device through a ZigBee® based WLAN. As a result, the first and second IoT devices can communicate with each other even though the first IoT device is configured to access network services through a Bluetooth® based WLAN and the second IoT device is configured to access network services through a ZigBee® based WLAN. Data can be translated or transformed for transmission according to a different protocol, e.g. from a Wi-Fi connected device to a ZigBee® connected device, at an applicable network device within a LAN, e.g. at the infrastructure network devices 104, a fog networking-based system, or a cloud-based system.

The infrastructure network devices 104 function as infrastructure devices by being formed as part of a local network infrastructure for providing network service access through LANs. For example, the infrastructure network devices 104 can be forwarding devices of a LAN network infrastructure and used to form, at least in part, a network back-end. In another example, the infrastructure network devices 104 can be edge devices of a LAN network infrastructure and used to form, at least in part, a ZigBee® network or a Wi-Fi network.

In a specific implementation, the infrastructure network devices 104 include protocol-compatible or protocol-specific hardware used in establishing and maintaining a LAN according to a specific protocol. For example, the infrastructure network devices 104 can include ZigBee® interfaces configured to allow the multi-protocol infrastructure network devices 104 to establish and maintain ZigBee® based WLANs. Further in the example, the infrastructure network devices 104 can include ZigBee® interfaces included as part of removable dongles coupled to the infrastructure network devices 104 or included as part of fixed hardware integrated into the infrastructure network devices 104. In another example, the infrastructure network devices 104 include hardware used in providing network service access through a Wi-Fi WLAN. In yet another example, the infrastructure network devices 104 include a USB interface that allows an IoT device to be coupled to the infrastructure network devices 104 through the USB interface, thereby forming, at least part of, a LAN.

In a specific implementation, the network devices 104 function as direct portals to a LAN back-end. In functioning as direct portals to a LAN back-end the infrastructure network devices 104 can be directly connected to a network switch, e.g. a router or a bridge, of a LAN back-end. The infrastructure network devices 104 can each be directly connected to corresponding individual network switches of a LAN back-end or a plurality of the infrastructure network devices 104 can be directly connected to a single network switch of the LAN back-end. A LAN back-end to which the infrastructure network devices 104 are coupled can be formed through either or both a combination of a wired or wireless back-end.

In a specific implementation, in serving as direct portals to a LAN back-end, a single device of the infrastructure network devices 104 can provide direct access to network services of a network, without having to exchange data with other devices at the edge of a LAN, e.g. other infrastructure network devices 104 at the edge of a network. For example, if an IoT device is coupled to an infrastructure network device through a ZigBee® connection as part of a ZigBee® network, data can be exchanged between the IoT device and a LAN back-end using the infrastructure network device without having to exchange the data with another infrastructure network device or IoT device forming a node as part of the ZigBee® network. By providing direct access to a LAN back-end, without exchanging data from other edge devices, power consumption levels of the other edge devices can be reduced and/or network traffic on the other edge devices can be reduced leading to increased network throughput.

In a specific implementation, the infrastructure network devices 104 are directly interconnected edge devices of a LAN. Directly interconnected edge devices are edge devices that are directly connected to each other independently from couplings provided through a LAN back-end. Specifically, the infrastructure network devices 104 can be coupled to each other through wireless connections along the edge of the LAN and outside of a LAN back-end. The infrastructure network devices 104 can exchange data directly between each other, without the use of a LAN back-end, through wired or wireless connections formed between the infrastructure network devices 104. In being directly interconnected edge devices, the infrastructure network devices 104 can communicate with each other when a LAN back-end and/or a WAN. The infrastructure network devices 104 can use connections directly interconnecting the infrastructure network devices 104 to manage IoT devices through LANs. For example, in being directly interconnected edge devices, the infrastructure network devices 104 can locally exchange data between IoT devices, as part of enforcing an IoT policy, when a WAN fails and Internet access is disrupted using, at least in part, wired or wireless connections directly connecting the infrastructure network devices 104 together independently from a LAN back-end.

In the example of FIG. 1, the IoT devices 106 are intended to represent devices that function to access network services of an enterprise or consumer network through a LAN. In accessing network services, the IoT devices 106 can use a LAN to either or both send and receive data. For example, the IoT devices 106 can use a WLAN to either or both send and receive data. Depending upon implementation-specific or other considerations, the IoT devices 106 can use a LAN to communicate with other IoT devices or sources or systems through a WAN. The IoT devices 106 can include wired and/or wireless interfaces through which the IoT devices 106 can send and receive data over wired and/or wireless connections. Examples of IoT devices include thermostats, mobile devices, biological managers, sensory devices, and functionality performing devices. In sending and receiving data over a wireless connection, the IoT devices 106 can communicate according to an applicable wireless communication protocol or standard, e.g. Wi-Fi, ZigBee®, Bluetooth®, Z-Wave®, applicable low-power communication standards, or applicable wireless PAN communication standards. For example, the IoT devices 106 can send and receive data over a ZigBee® WLAN defined by IEEE 802.15-4, which is hereby incorporated by reference. The IoT devices 106 can include unique identifiers which can be used to facilitate network service access by the IoT devices 106.

In a specific implementation, the IoT devices 106 act as or include stations, by including a wireless interface through which the IoT devices 106 can be coupled through Wi-Fi connections to an infrastructure network device for use in accessing network services. A station, as used in this paper, can be referred to as a device with a media access control (MAC) address and a physical layer (PHY) interface to a wireless medium that complies with the IEEE 802.11 standard. Thus, for example, the IoT devices 106 can be referred to as a station, if applicable. IEEE 802.11a-1999, IEEE 802.11b-1999, IEEE 802.11g-2003, IEEE 802.11-2007, IEEE 802.11n TGn Draft 8.0 (2009), and IEEE 802.11ac-2013 are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative implementations, a station may comply with a different standard than Wi-Fi or IEEE 802.11, may be referred to as something other than a "station," and may have different interfaces to a wireless or other medium.

IEEE 802.3 is a working group and a collection of IEEE standards produced by the working group defining the physical layer and data link layer's MAC of wired Ethernet. This is generally a LAN technology with some wide area network applications. Physical connections are typically made between nodes and/or network devices, e.g. infrastructure network devices (hubs, switches, routers), by various types of copper or fiber cable. IEEE 802.3 is a technology that supports the IEEE 802.1 network architecture. As is well-known in the relevant art, IEEE 802.11 is a working group and collection of standards for implementing WLAN computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In a specific implementation, the IoT devices 106 function to only send data generated at the IoT devices 106. In only sending data, the IoT devices 106 can function to access network services of a network provided through a LAN using infrastructure network devices. For example, the IoT devices 106 can include beacons configured to transmit beacon signals.

In the example of FIG. 1, the LAN 108 is intended to represent a network that provides wired or wireless communication channels through which IoT devices can access network services of a network, e.g. an enterprise or consumer network. The LAN 108 can be established and maintained according to applicable wired or wireless communication protocols or standards, e.g. Wi-Fi, ZigBee®, Bluetooth®, applicable low-power communication standards, or applicable wired or wireless PAN communication standards. The LAN 108 can be used to transmit signals to and from IoT devices as part of the devices accessing network services through a multi-protocol infrastructure network device.

In the example, of FIG. 1, the LAN 108 includes a computer-readable medium, but is differentiated from the computer-readable medium 102 to illustrate the bifurcation of the medium by the multi-protocol infrastructure network devices 104. While the LAN 108 is shown to represent only a single LAN, it can represent a plurality of different LANs, potentially established and maintained according to different standards. For example the LAN 108 can include a ZigBee® based WLAN maintained simultaneously with a Wi-Fi based WLAN.

In a specific implementation, the LAN 108 is used to transmit IoT device data from an IoT device to an applicable device for providing the IoT device access to network services, such as the multi-protocol infrastructure network devices described in this paper. IoT device data includes applicable data generated at an IoT device. For example, IoT device data can include images or a feed of captured images forming video generated at a camera. Further in the example, the LAN 108 can be formed through a USB connection and used to transmit the captured images or the feed of captured images from the camera to an applicable device for providing the camera access to network services, such as the multi-protocol infrastructure network devices described in this paper.

In the example of FIG. 1, the local state aware device manager 112 is intended to represent a system that locally maintains a configuration state of a device for purposes of managing the device in operation. A configuration state of a device can include a configuration, e.g. how a device is operating, in providing access to network services and a configuration, e.g. how a device is operating, in accessing network services through a network. A device, as used in this paper, can include an IoT device, capable of accessing or providing access to network services, and an infrastructure network device, capable of providing access to network services. The local state aware device manager 112 can maintain a configuration state of an IoT device for purposes of managing the IoT device in operation. For example, if an IoT device is currently connected to a network, in accessing network services, then the local state aware device manager 112 can maintain a configuration state of the IoT device including the IoT device is currently accessing network services through the network. Additionally, the local state aware device manager 112 can maintain a configuration state of a network device, e.g. infrastructure network device, for purposes of controlling operation of the network device in providing network service access. The local state aware device manager 112 can be implemented locally at a device for which the local state aware device manager 112 is locally maintaining a current configuration state.

In a specific implementation, the local state aware device manager 112 functions to configure a device to operate based on a maintained state of the device in operation. The local state aware device manager 112 can configure a device to operate based on received desired configuration instructions. Desired configuration instructions received by the local state aware device manager 112 can be generated based on a current configuration state, otherwise actual configuration state, of a device and be used to configure the device to shift to operating at a desired configuration state from the current configuration state, thereby clearing the current configuration state at which the device is operating. For example, if an IoT device is operating when a user is not present, then the local state aware device manager 112 can configure the IoT device to operate when the user is present, according to received desired configuration instructions. Additionally desired configuration instructions received by the local state aware device manager 112 can be either or both generated and transmitted using an applicable asynchronous and event-driven message-passing architecture, e.g. an architecture built on Akka actors. The local state aware device manager 112 can configure a device to operate based on clear interrupts commands (hereinafter referred to as "CLI commands"), included as part of desired configurations instructions instructing how to configure a device to operate at a desired configuration state. For example, the local state aware device manager 112 can configure an infrastructure network device providing access to network services to operate at a desired configuration state in providing access to the network services, according to received CLI commands.

In a specific implementation, the local state aware device manager 112 functions to locally maintain a configuration state of an IoT device at an infrastructure network device used in providing network service access to the IoT device. For example, the local state aware device manager 112 can locally maintain a configuration state of an IoT device accessing network services through an infrastructure network device functioning as an access point at the infrastructure network device. Further in the example, the local state aware device manager 112 can be implemented as an agent at the infrastructure network device providing the IoT device access to network services.

In a specific implementation, the local state aware device manager 112 functions to use stream processing of data streams of data transmitted to and from a device to maintain a configuration state of the device. The local state aware device manager 112 can use stream processing of a stream of data transmitted to and from an IoT device, as part of the IoT device accessing network services, to maintain a current configuration state of the IoT device. Additionally, the local state aware device manager 112 can use stream processing of streams of data transmitted to and from an infrastructure network device as part of the infrastructure network device providing IoT devices network service access, to maintain a current configuration state of the infrastructure network device. The local state aware device manager 112 can use an applicable mechanism for processing a data stream generated in accessing network services or providing access to network services to maintain a configuration state of device based on the data stream.

In a specific implementation, the local state aware device manager 112 is implemented on a central network device and functions to configure a cluster of devices to operate based on maintained states of the devices in operation. The local state aware device manager 112 can maintain states of each device in a cluster of device at a central network device. For example, the local state aware device manager 112 can receive data streams, at a central network device, from either or both IoT devices and infrastructure network devices and subsequently process the data streams to maintain current configuration states of either or both the IoT device and the infrastructure network devices at the central network device. Further, the local state aware device manager 112 can provide desired configuration instructions from a central network device to devices within a cluster for purposes of causing the devices to operate at desired configuration states based on current configuration states at which the devices are operating. In being implemented at a central network device and configured to control operation of a cluster of devices, the local state aware device manager 112 can control operation of the cluster of devices according to an applicable device management protocol. For example, the local state aware device manager 112 can be configured to control operation of devices in a cluster according to the control and provisioning of wireless access points (hereinafter referred to as "CAPWAP") protocol as specified in RFC 5415, which is hereby incorporated by reference.

In the example of FIG. 1, the state aware device configuration agnostic mediator 114 is intended to represent a system that remotely controls a device configuration based on a current configuration state of a device. The state aware device configuration agnostic mediator 114 can remotely control a configuration of either or both an IoT device accessing network services and an infrastructure network device used in providing network service access based on current configuration states of the devices. For example, the state aware device configuration agnostic mediator 114 can control an infrastructure network device to cause the device to stop operating at its current configuration state and to begin operating at a desired configuration state. In another example, the state aware device configuration agnostic mediator 114 can control an IoT device to cause the device to stop operating at its current configuration state and to begin operating at a desired configuration state.

The state aware device configuration agnostic mediator 114 is state aware in that it controls operation of a device based on a current configuration state of a device. Specifically, based on a current configuration state of a device in operation, the state aware device configuration agnostic mediator 114 can determine operation changes that need to be made to the device operating in its current configuration state in order to achieve a desired configuration state at the device. For example, if a current configuration state indicates a radio of an infrastructure network device is operating at a threshold of fifty maximum served clients, then the state aware device configuration agnostic mediator 114 can determine to increase the threshold by fifty to achieve a desired threshold of one hundred maximum served clients.

The state aware device configuration agnostic mediator 114 is device configuration agnostic in that the state aware device configuration agnostic mediator 114 can control operation of a device based on an actual current configuration state of the device agnostic as to how a device is supposed to be configured to operate, or an otherwise assumed configuration state of the device. Specifically, if a device is supposed to be configured to operate according to operation parameter A, and the device is actually operating at operation parameter A' instead of A, then the state aware device configuration agnostic mediator 114 can configure the device to operate at a desired configuration state based on the device operating at A' rather than A. In controlling operation of a device based on an actual current configuration state of operation of the device as opposed to an assumed configuration state of the device, the state aware device configuration agnostic mediator 114 can easily steer the device from operating at the actual current configuration state by causing the device to operate at a desired configuration state.

In a specific implementation, the state aware device configuration agnostic mediator 114 functions to remotely maintain current configuration state data indicating current configuration states of devices. For example, the state aware device configuration agnostic mediator 114 can maintain current configuration state data indicating a current configuration state of either or both an IoT device and an infrastructure network device remote from the devices. The state aware device configuration agnostic mediator 114 can maintain state data for a device based on a stream of data transmitted to and from the device as part of the device either or both accessing network services and providing network service access. For example, the state aware device configuration agnostic mediator 114 can process data streams flowing through an infrastructure network device in providing network service access to determine a current configuration state of the infrastructure network device. In another example, the state aware device configuration agnostic mediator 114 can process data streams flowing to and from an IoT device as part of the IoT device accessing network services to determine a current configuration state of the IoT device.

In a specific implementation, the state aware device configuration agnostic mediator 114 functions to query an applicable system for locally maintaining a configuration state of a device, such as the local state aware device managers described in this paper, for locally maintained current configuration state data indicating a current configuration state of the device. In response to a query for current configuration state data, the state aware device configuration agnostic mediator 114 can receive at a remote location from a local source with respect to a device, current configuration state data indicating a current configuration state of the device. The state aware device configuration agnostic mediator 114 can query and subsequently receive locally maintained current configuration state data from one or a combination of a device itself, a device used in providing another device access to network services, and a device used to manage another device. For example, the state aware device configuration agnostic mediator 114 can receive current configuration state data of an infrastructure network device from the infrastructure network device itself. In another example, the state aware device configuration agnostic mediator 114 can receive current configuration state data of an IoT device, from an infrastructure network device providing the IoT device network service access. In yet another example, the state aware device configuration agnostic mediator 114 can receive current configuration state data of an infrastructure network device in a cluster of network devices from another infrastructure network device managing operation of the cluster of the network devices.

In a specific implementation, the state aware device configuration agnostic mediator 114 functions to control and otherwise vary the frequency at which it queries applicable systems to determine locally maintained current configuration states of devices. For example, the state aware device configuration agnostic mediator 114 can poll, e.g. by querying, a first subset of network devices every hour for their locally maintained current configuration states and poll a second subset of network devices every thirty minutes for their locally maintained current configuration states. The state aware device configuration agnostic mediator 114 can control and otherwise vary frequencies at which it polls devices for locally maintained current configuration state data based on performance of devices in accessing network services and providing network services. For example, the state aware device configuration agnostic mediator 114 can vary a frequency at which it polls devices for current configuration state data based on activity of a device in gaining access to network services or providing access to network services. In another example, the state aware device configuration agnostic mediator 114 can vary a frequency at which it polls devices for current configuration state data based on whether a user is actively troubleshooting problems with the devices in accessing network services or providing access to network services. In yet another example, the state aware device configuration agnostic mediator 114 can vary a frequency at which it polls devices for current configuration state data based on whether network devices are overloaded in providing network service access.

In a specific implementation, the state aware device configuration agnostic mediator 114 functions to use device association and dissociation to control configuring of the device to operate according to a desired configuration state. In using device association and dissociation to control configuring of a device, the state aware device configuration agnostic mediator 114 can cause a device to dissociate and re-associate and subsequently cause the device to send locally maintained current configuration state data to the state aware device configuration agnostic mediator 114. The state aware device configuration agnostic mediator 114 can subsequently use the locally maintained current configuration state data of the device received as a result of causing the device to disassociate and re-associate, to reconfigure the device to operate at a desired configuration state. Additionally, the state aware device configuration agnostic mediator 114 can receive locally maintained current configuration state data every time a device associates with a network. For example, the state aware device configuration agnostic mediator 114 can receive locally maintained current configuration state data of an IoT device when the IoT device begins accessing network services through a LAN. In another example, the state aware device configuration agnostic mediator 114 can receive locally maintained current configuration state data of an infrastructure network device when the infrastructure network device associates with a LAN and begins providing network service access through the LAN.

In a specific implementation, the state aware device configuration agnostic mediator 114 functions to poll applicable devices for locally maintained current configuration state data indicating current configuration states in response to an inability to access remotely maintained current configuration state data indicating the current configuration states. For example, if a server providing access to remotely maintained current configuration state data fails, then the state aware device configuration agnostic mediator 114 can poll specific devices to provide current configuration state data indicating current configuration states of devices. Further in the example, if a server providing access to remotely maintained current configuration state data for a cluster of devices fails, then the state aware device configuration agnostic mediator 114 can poll an infrastructure network device configured to manage operation of the cluster of devices to provide current configuration state data of devices in the cluster of devices locally maintained at the infrastructure network device.

In a specific implementation, the state aware device configuration agnostic mediator 114 functions to control operation of a device based on a current configuration state of operation of the device. In controlling operation of a device based on a current configuration state of operation of the device, the state aware device configuration agnostic mediator 114 can cause a device to operate at a desired configuration state based on knowledge of a current configuration state at which the device is operating. The state aware device configuration agnostic mediator 114 can use locally maintained current configuration state data to control operation of a device according to a current configuration state of operation of the device. For example, the state aware device configuration agnostic mediator 114 can use current configuration state data for an infrastructure network device locally maintained at the infrastructure network device to control operation of the local infrastructure network device based on a current configuration state at which the network device is operating. Additionally, the state aware device configuration agnostic mediator 114 can use remotely maintained current configuration state data to control operation of a device according to a current configuration state of operation of the device. For example, the state aware device configuration agnostic mediator 114 can use remotely maintained current configuration state data generated from data streams transmitted through an infrastructure network device in providing access to network services to control operation of the infrastructure network device based on a current configuration state at which the device is operating.

In a specific implementation, in controlling operation of a device, the state aware device configuration agnostic mediator 114 can generate and provide desired configuration instructions to an applicable device for controlling operation of the device based a current configuration state of operation. The state aware device configuration agnostic mediator 114 can provide desired configuration instructions to one or a combination of a device managing a cluster of devices, a device providing another device network service access, and a device accessing network services. For example, the state aware device configuration agnostic mediator 114 can provide desired configuration instructions to an infrastructure network device providing IoT devices network service access. Further in the example, the infrastructure network device can configure the IoT devices to operate at a desired configuration state according to the desired configuration instructions.

In a specific implementation, the state aware device configuration agnostic mediator 114 functions to either or both generate and transmit desired configuration instructions using an applicable asynchronous and event-driven message-passing architecture, e.g. an architecture built on Akka actors. The state aware device configuration agnostic mediator 114 can generate desired configuration instructions including CLI commands instructing how to configure a device to operate at a desired configuration state. For example, the state aware device configuration agnostic mediator 114 can generate desired configuration instructions including CLI commands instructing an infrastructure network device to increase the threshold of served clients after which the device begins handing off clients, in operating at a desired configuration state. The state aware device configuration agnostic mediator 114 can generate CLI commands included as part of desired configuration instructions by translating an applicable representation of a configuration message into one or a plurality of CLI commands.

In a specific implementation, the state aware device configuration agnostic mediator 114 functions to generate desired configuration instructions used in causing a device to operate at a desired configuration state based on a device state-based operation configuration model. A device state-based operation configuration model includes a mapping of specific configuration instructions capable of being used to cause a device to switch from operating at a specific current configuration state to operate at, at least in part, a new configuration state. For example, a device state-based operation configuration model can indicate in response to configuration instructions ABC, a device operating at a configuration state of XYZ will be configured, to operate at least in part, at a configuration state of X'Y'Z'.

In a specific implementation, in using a device state-based operation configuration model to generate desired configuration instructions, the state aware device configuration agnostic mediator 114 state aware device configuration agnostic mediator 114 can use either or both a desired configuration state and a current configuration state at which a device is operating. For example, the state aware device configuration agnostic mediator 114, based on a desired configuration state and a current configuration state, can look up specific configuration instructions mapped to causing a device operating at the current configuration state to switch to operating at the desired configuration state. Further in the example, the state aware device configuration agnostic mediator 114 can subsequently generate desired configuration instructions based on the specific configuration instructions mapped to causing a device to switch from operating at the current configuration state to the desired configuration state. In generating desired configuration instructions using a device state-based operation configuration model based on either or both actual configuration states at devices and desired configuration states, the state aware device configuration agnostic mediator 114 is state aware, in that it controls operation of devices based on configuration states of devices.

In a specific implementation, the state aware device configuration agnostic mediator 114 functions to generate and maintain a device state-based operation configuration model. A device state-based operation configuration model can be generated based on specific configuration instructions, e.g. desired configuration instructions, and specific configuration states, e.g. current configuration states and desired configuration states, achieved at devices using the specific configuration instructions. For example, if a device or plurality of devices switches from operating at a configuration state of XYZ to operating at a configuration state of X'Y'Z' in response to configuration instructions ABC, then a device state-based operation configuration model can be generated or updated to include a mapping of configuration instructions ABC to a device configuration state switching from XYZ to X'Y'Z'. The state aware device configuration agnostic mediator 114 can continually update a device state-based operation configuration model based on specific configuration state switching at devices in response to specific configuration instructions.

A device state-based operation configuration model can be specific to one or a combination of a single device, a specific type of device, operation of a device in accessing network services, and operation of a device in providing access to network services. For example, a device state-based operation configuration model can be specific to a type of device and used to control operation of devices of the type in achieving a desired configuration state. In another example, a device state-based operation configuration model can be specific to a device in operating to access a specific type of network services, and used to control operation of devices accessing the specific type of network services.

In a specific implementation, the state aware device configuration agnostic mediator 114 functions to generate device configuration instructions based, at least in part, on user input. For example, the state aware device configuration agnostic mediator 114 can receive user input indicating a desired configuration state of a device, and based on the desired configuration state generate device configuration instructions to cause the device to switch to operating, at least in part, at the desired configuration state. In utilizing user input to generate device configuration instructions, the state aware device configuration agnostic mediator 114 can use a device state-based operation configuration model. For example, if user input indicates a desired configuration state of XYZ, then the state aware device configuration agnostic mediator 114 can use a device state-based operation configuration model to determine specific configuration instructions to cause a device to switch to operating at the configuration state of XYZ. Further in the example, the state aware device configuration agnostic mediator 114 can generate desired configuration instructions based on the determined specific configuration instructions identified from the device state-based operation configuration model.

In a specific implementation, the state aware device configuration agnostic mediator 114 functions to generate device configuration instructions based on an unknown configuration state at which a device is operating. An unknown configuration state can be a current state of operation of a device indicated by current state data maintained locally or remotely from the device. An unknown configuration state can be for a device that is newly associated with a network or for a device in which current configuration state data has been deleted or is otherwise inaccessible. An unknown configuration state as a current configuration state can be included as part of a device state-based operation configuration model. For example, a device state-based operation configuration model can include a mapping of specific configuration instructions to cause a device operating at an unknown configuration state to switch to operating at a specific configuration state.

In an example of operation of the example system shown in FIG. 1, the local state aware device manager 112 locally maintains current configuration state data indicating a current configuration state of an infrastructure network device of the infrastructure network devices 104. In the example of operation of the example system shown in FIG. 1, the state aware device configuration agnostic mediator 114 determines a desired configuration state at which the infrastructure network device should operate. Further, in the example of operation of the example system shown in FIG. 1, the state aware device configuration agnostic mediator 114 generates desired configuration instruction to cause the infrastructure network device to switch from operating at the current configuration state to the desired configuration state, based on the current configuration state. In the example of operation of the example system shown in FIG. 1, the state aware device configuration agnostic mediator 114 provides the desired configuration instructions to the local state aware device manager 112 which subsequently uses the instructions to cause the infrastructure network device to switch to operating at the desired configuration state.

Figure 2:
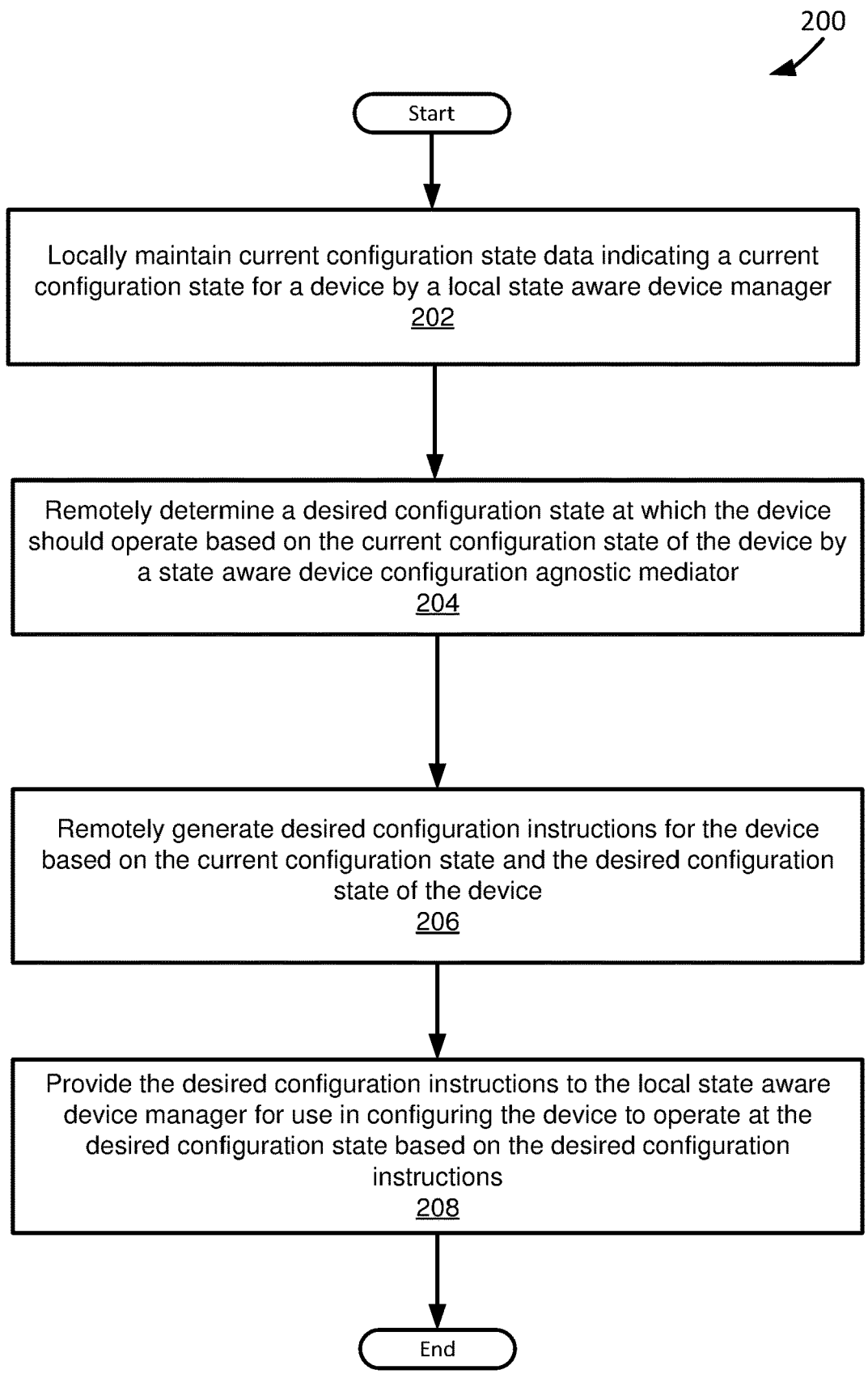
FIG. 2 depicts a flowchart of an example of a method for controlling operation of a device based on a current configuration state at which the device is operating.

FIG. 2 depicts a flowchart 200 of an example of a method for controlling operation of a device based on a current configuration state at which the device is operating. The flowchart begins at module 202, where current configuration state data indicating a current configuration state of a device is maintained locally by a local state aware device manager. A device for which a current configuration state is maintained can be an IoT device or an infrastructure network device. A current configuration state can be locally maintained by processing a data stream flowing through a device. For example, a current configuration state can be locally maintained by processing a data stream flowing through an infrastructure network device in providing network service access. In another example, a current configuration state can be locally maintained by processing a data stream flowing through an IoT device as part of the IoT device accessing network services.

The flowchart 200 continues to module 204, where a desired configuration state at which the device should operate is remotely determined based on the current configuration state of the device by a state aware device configuration device configuration agnostic mediator. For example, if the current configuration state indicates the device is failing to operate as a wave 2 compatible device in providing network service access using Wi-Fi, then it can be determined a desired configuration state is the device operating as a wave 2 compatible device. The current configuration state of the device used to determine the desired configuration state can be determined remotely at a state aware device configuration agnostic mediator. For example, the current configuration state of the device used to determine the desired configuration state can be determined remotely at the state aware device configuration agnostic mediator by processing a data stream flowing to and from the device in accessing network services or providing network service access. Additionally, the current configuration state of the device used to determine the desired configuration state can be determined locally at the local state aware device manager and subsequently provided to a remote location at the state aware device configuration agnostic mediator. The desired configuration state can also be determined based on received user input. Specifically, received user input can indicate one or a plurality of desired configuration states at which the device should be operating.

The flowchart 200 continues to module 206, where desired configuration instructions for the device are remotely generated based on the current configuration state and the desired configuration state of the device. An applicable system for remotely managing operation of a device, such as the state aware device configuration agnostic mediators described in this paper, can remotely generate desired configuration instructions for the device based on the current configuration state and the desired configuration state. Desired configuration instructions for the device can be generated based on the desired configuration state and the current configuration state using a device state-based operation configuration model. For example, a device state-based operation configuration model can be used to determine configuration instructions mapped to causing a device to switch operating from the current configuration state to the desired configuration state. A device state-based operation configuration model used to determine configuration instructions for generating desired configuration instructions can be selected based on one or a combination of the current configuration state, the desired configuration state, a device type of the device, network services the device is accessing, network services the device is providing access to, and other applicable characteristics related to network service access of the device.

The flowchart 200 continues to module 208, where the desired configuration instructions are provided to the local state aware device manager for use in configuring the device to operate at the desired configuration state based on the desired configuration instructions. The desired configuration instructions can be provided to an infrastructure network device configured to manage a cluster of devices including the device, for use by the infrastructure network device in configuring the device to operate at the desired configuration state. Additionally, the desired configuration instructions can be provided to an infrastructure network device configured to provide the device network service access for use by the infrastructure network device in configuring the device to operate at the desired configuration state. Further, the desired configuration instructions can be provided to the device itself for use by the device in configuring itself to operate at the desired configuration state.

Figure 3:
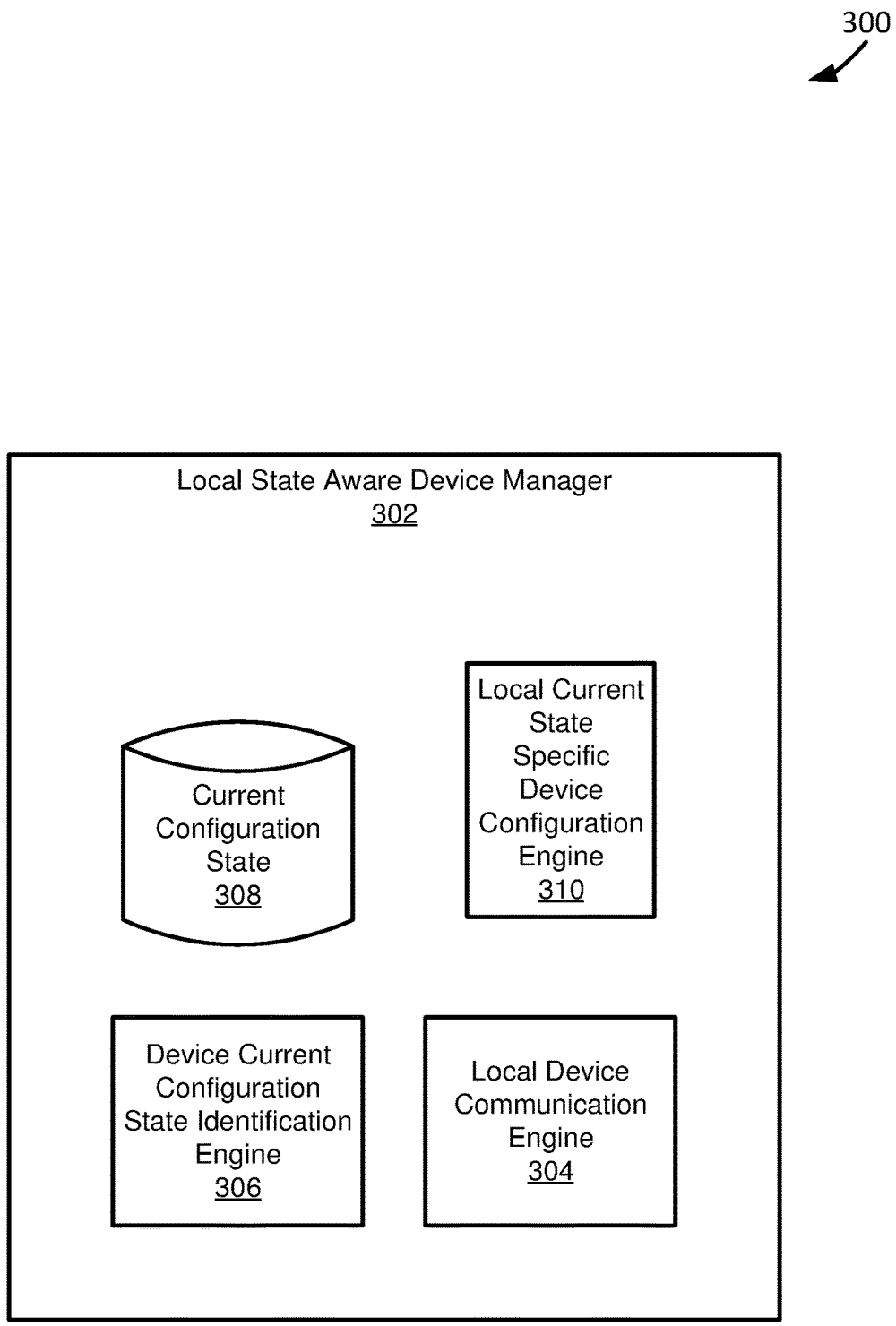
FIG. 3 depicts a diagram of an example local state aware device manager system.

FIG. 3 depicts a diagram 300 of an example local state aware device manager 302. The local state aware device manager 302 is intended to represent an applicable system that functions to locally manage device configuration based, at least in part, on a current configuration state of the device, such as the local state aware device managers described in this paper. In locally managing a device's configuration based on a current configuration state of the device, the local state aware device manager 302 can be implemented at one or a combination of a device used to manage a cluster of devices including the device, an infrastructure network device configured to provide the device network service access, and the device itself. For example, the local state aware device manager 302 can be implemented at an infrastructure network device configured to provide an IoT device network service access. In another example, the local state aware device manager 302 can be implemented at an infrastructure network device and configured to manage a configuration of the infrastructure network device.

In a specific implementation, the local state aware device manager 302 functions to locally maintain current configuration state data indicating a current configuration state of a device the local state aware device manager 302 is formed to manage in operation configuration. In maintaining current configuration state data, the local state aware device manager 302 can determine a current configuration state of a device. The local state aware device manager 302 can determine a current configuration state of a device by processing a data stream flowing through the device in either or both providing network service access and accessing network services. For example, the local state aware device manager 302 can determine a current configuration state of an IoT device by processing a data stream flowing through the IoT device as the IoT device accesses network services. In another example, the local state aware device manager 302 can determine a current configuration state of an infrastructure network devices by processing data streams flowing through the infrastructure network device as part of the infrastructure network device providing access to network services.

In a specific implementation, the local state aware device manager 302 functions to provide locally maintained current configuration state data indicating a current configuration state of a device to a remote system. The local state aware device manager 302 can provide locally maintained current configuration state data to a remote system in response to being polled by the remote system. Additionally, the local state aware device manager 302 can provide locally maintained current configuration state data to a remote system after a device managed by the local state aware device manager 302 associates, e.g. disassociates and associates again with a network to access or provide access to network services.

In a specific implementation, the local state aware device manger 302 functions to receive desired configuration instructions for configuring a device based on a current configuration state of the device from a remote system. For example, the local state aware device manager 302 can receive desired configuration instructions generated based on a current configuration state of a device and a desired configuration state of the device. The local state aware device manager 302 can configure a device to operate at a desired configuration state based desired configuration instructions from an applicable remote system, such as the state aware device configuration agnostic mediators described in this paper.

In the example of FIG. 3, the example local state aware device manager 302 includes a local device communication engine 304, a device current configuration state identification engine 306, a current configuration state datastore 308, and a local current state specific device configuration engine 310. The local device communication engine 304 is intended to represent an engine, implemented locally, that functions to send and receive data used in configuring a device to operate based on a current configuration state of the device. The local device communication engine 304 can receive a data stream used in a device either or both accessing network services and providing access to network services. The local device communication engine 304 can receive a data stream from a device at which the local state aware device manager 302 is implemented. For example, the local device communication engine 304 can receive a data stream used by an infrastructure network device in providing access to network services by the device from the device itself. Additionally, the local device communication engine 304 can receive a data stream from a device of a cluster of devices at a device configured to manage the cluster of devices. For example, the local device communication engine 304 can be implemented at a device for managing a cluster of infrastructure network devices and receive a data stream from an infrastructure network device of the cluster of devices.

In a specific implementation, the local device communication engine 304 functions to provide locally maintained current configuration state data indicating a current configuration state of a device to a remote system. The local device communication engine 304 can provide current configuration state data to an applicable remote system for managing remote configuring of a device according to a current configuration state of the device, such as the state aware device configuration agnostic mediators described in this paper. The local device communication engine 304 can provide locally maintained current configuration state data to a remote system when the local state aware device manager 302 is poled by the remote system. Additionally, the local device communication engine 304 can provide locally maintained current configuration data to a remote system when a device managed by the local state aware device manager associates or re-associates with a network. For example, the local device communication engine 304 can provide locally maintained current configuration state data after a device disassociates and re-associates with a network.

In a specific implementation, the local device communication engine 304 functions to receive desired configuration instructions for use in configuring a device to operate at a desired configuration state. The local device communication engine 304 can receive desired configuration instructions generated based on a current configuration state of a device. For example, the local device communication engine 304 can receive desired configuration instructions generated using a device state-based operation configuration model based on a current configuration state of a device and a desired configuration state.

In the example of FIG. 3, the device current configuration state identification engine 306 is intended to represent an engine that functions to determine a current configuration state of a device managed by the local state aware device manager 302. The device current configuration state identification engine 306 can process a data stream received from a device as part of the device accessing network services or providing access to network services to determine a current configuration state of the device. The device current configuration state identification engine 306 can process a data stream using an applicable mechanism for determining a current configuration state of a device from a data stream used in accessing network services or providing access to network services. Current configuration state data stored in the current configuration state datastore 308 can be maintained by an applicable engine for identifying a current configuration state of a device such as the device current configuration state identification engine.

The current configuration state datastore 308 is intended to represent a datastore that locally stores current configuration state data indicating current configuration states of devices. Current configuration state data stored in the current configuration state datastore 308 can be generated and maintained by processing data streams transmitted through devices in accessing network service or providing access to network services. For example, current configuration state data stored in the current configuration state datastore 308 for an IoT device can be generated and maintained by processing streams of data transmitted to and from the IoT device as part of the IoT device accessing network services. In another example, current configuration state data stored in the current configuration state datastore 308 for an infrastructure network device can be generated and maintained by processing stream of data transmitted to and from the infrastructure network device as part of the infrastructure network device providing access to network services.

The local current state specific device configuration engine 310 is intended to represent an engine that functions to locally configure devices to operate based on a current configuration state of the devices. The local current state specific device configuration engine 310 can use an applicable method for configuring devices to configure devices to operate based on a current configuration state of the devices. For example, the local current state specific device configuration engine 310 can control operation of devices in a cluster of devices according to the CAPWAP protocol. In controlling operation of devices based on a current configuration state of the devices, the local current state specific device configuration engine 310 can configure device to operate at desired configuration states.

In a specific implementation, in controlling operation of devices based on a current configuration state of the devices, the local current state specific device configuration engine 310 functions to configure devices based on desired configuration instructions received from an applicable remote system. For example, the local current state specific device configuration engine 310 can configured devices to operate at desired configuration states based on desired configuration instructions received from a state aware device configuration agnostic mediator. In using desired configuration instructions to configure a devices, the local current state specific device configuration engine 310 can identify CLI commands included as part of the instructions and configure the devices based on the CLI commands.

In an example of operation of the local state aware device manager 302 shown in FIG. 3, the local device communication engine 304 receives a data stream used by a device to either provide access to network services or access network services. In the example of operation of the example system shown in FIG. 3, the device current configuration state identification engine 306 performs processing on the data stream received by the local device communication engine 304 to identify a current configuration state of the device. Further, in the example of operation of the example system shown in FIG. 3, the device current configuration state identification engine 306 updates current configuration state data stored in the current configuration state datastore 308 to indicate the current configuration state of the device. In the example of operation of the example system shown in FIG. 3, the local device communication engine 304 provides the current configuration state to a remote system for managing devices based on current configuration states. Additionally, in the example of operation of the example system shown in FIG. 3, the local device communication engine 304 receives desired configuration instructions generated based on the current configuration state of the device from the remote system. In the example of operation of the example system shown in FIG. 3, the local current state specific device configuration engine 310 configures the device to operate at a desired configuration state using the received desired configuration instructions.

Figure 4:
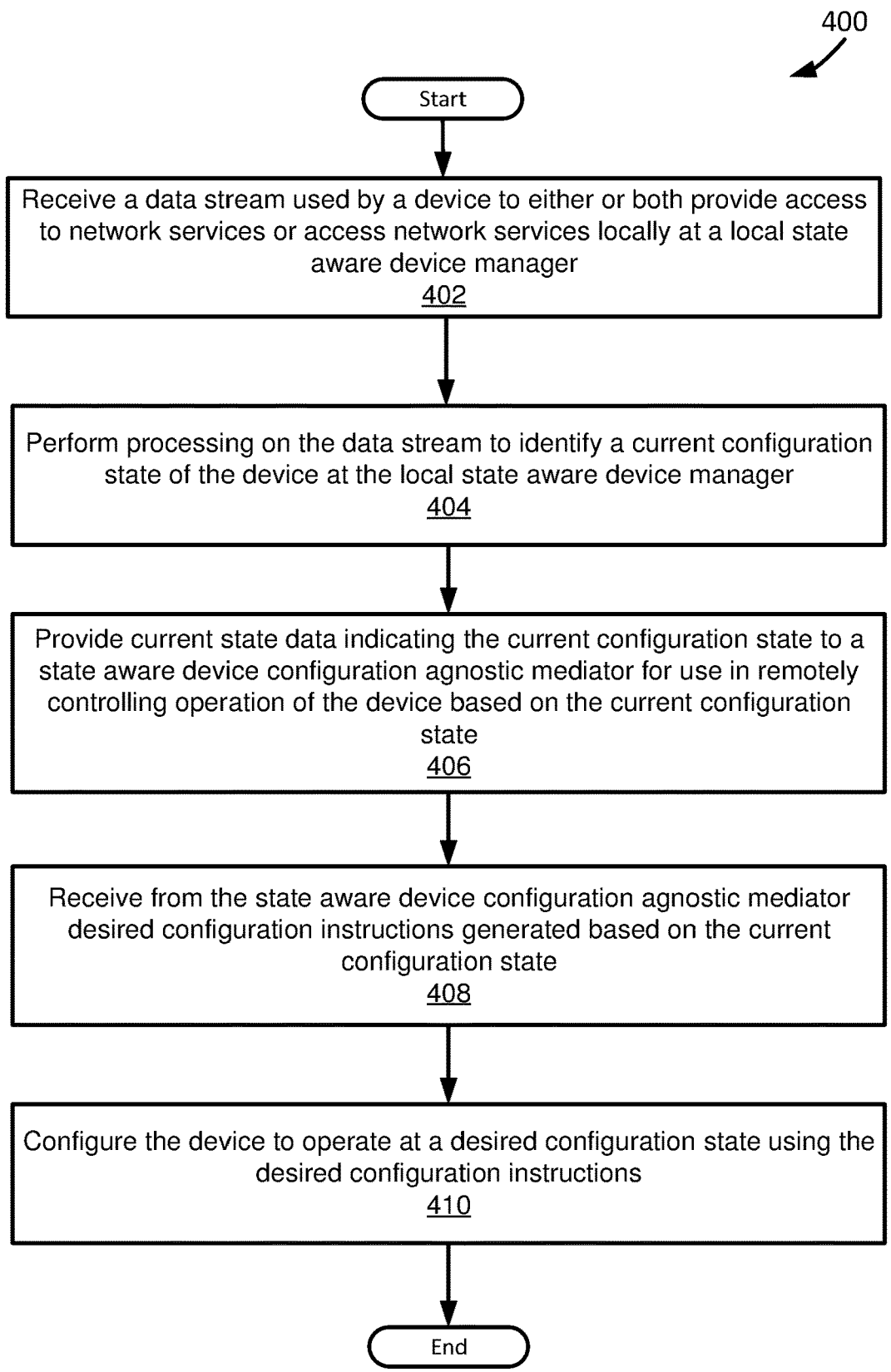
FIG. 4 depicts a flowchart of an example of a method for locally configuring a device to operate based on a current configuration state of the device.

FIG. 4 depicts a flowchart 400 of an example of a method for locally configuring a device to operate based on a current configuration state of the device. The flowchart 400 begins at module 402, where a data stream used by a device to either or both provide access to network services or access network services is received locally at a local state aware device manager. A data stream can be received from an infrastructure network device of a cluster of infrastructure network devices at a local state aware device manager implemented at a device configured to manage the cluster of infrastructure network devices. Further, a data stream can be received from an infrastructure network device providing network service access to an IoT device at a local state aware device manager implemented at the infrastructure network device. A data stream used by a device to either or both provide access to network services or access network services can be received by an applicable engine for sending data to and from a device for use in controlling operation of a device based on a current configuration state of the device, such as the local device communication engines described in this paper.

The flowchart 400 continues to module 404, where processing on the data stream is performed to identify a current configuration state of the device at the local state aware device manager. An applicable engine for determining a current configuration state of a device, such as the device current configuration state identification engines described in this paper, can process the data stream to identify a current configuration state of the device at the local state aware device manager. An applicable method for processing data streams related to providing access to or accessing network services can be used to identify a current configuration state of the device based on the data stream.

The flowchart 400 continues to module 406, where current state data indicating the current configuration state is provided to a state aware device configuration agnostic mediator for use in remotely controlling operation of the device based on the current configuration state. A state aware device configuration agnostic mediator can be remote from the local state aware device manager and used to remotely manage operation of the device based on the current state data indicating the current configuration state. An applicable engine for sending data to and from a device for use in controlling operation of a device based on a current configuration state of the device, such as the local device communication engines described in this paper, can provide current state data indicating the current configuration state to a state aware device configuration agnostic mediator. The current state data can be provided in response to a query received from a state aware device configuration agnostic mediator as part of polling of devices. Additionally, the current state data can be provided to a state aware device configuration agnostic mediator in response to the device associating or re-associating with a network.

The flowchart 400 continues to module 408, where desired configuration instructions generated based on the current configuration state are received from the state aware device configuration agnostic mediator. An applicable engine for sending data to and from a device for use in controlling operation of a device based on a current configuration state of the device, such as the local device communication engines described in this paper, can receive from the state aware device configuration agnostic mediator desired configuration instructions generated based on the current configuration state of the device. Received desired configuration instructions can be generated based on the current configuration state using a device state-based operation configuration model. Additionally, received desired configuration instructions can be generated based on the current configuration state and received user input using a device state-based operation configuration model.

The flowchart 400 continues to module 410, where the device is configured to operate at a desired configuration state using the desired configuration instructions. The device can be configured to operate at a desired configuration state using the desired configuration instructions locally by the local state aware device manager. An applicable engine for controlling operation of a device based on a current state of the device, such as the local current state specific device configuration engines described in this paper, can configure the device to operate at a desired configuration using the desired configuration instructions. The device can be configured to operate at a desired configuration using the desired configuration instructions according to an applicable mechanism for controlling operation of a device in either or both providing access to network services and accessing network services.

Figure 5:
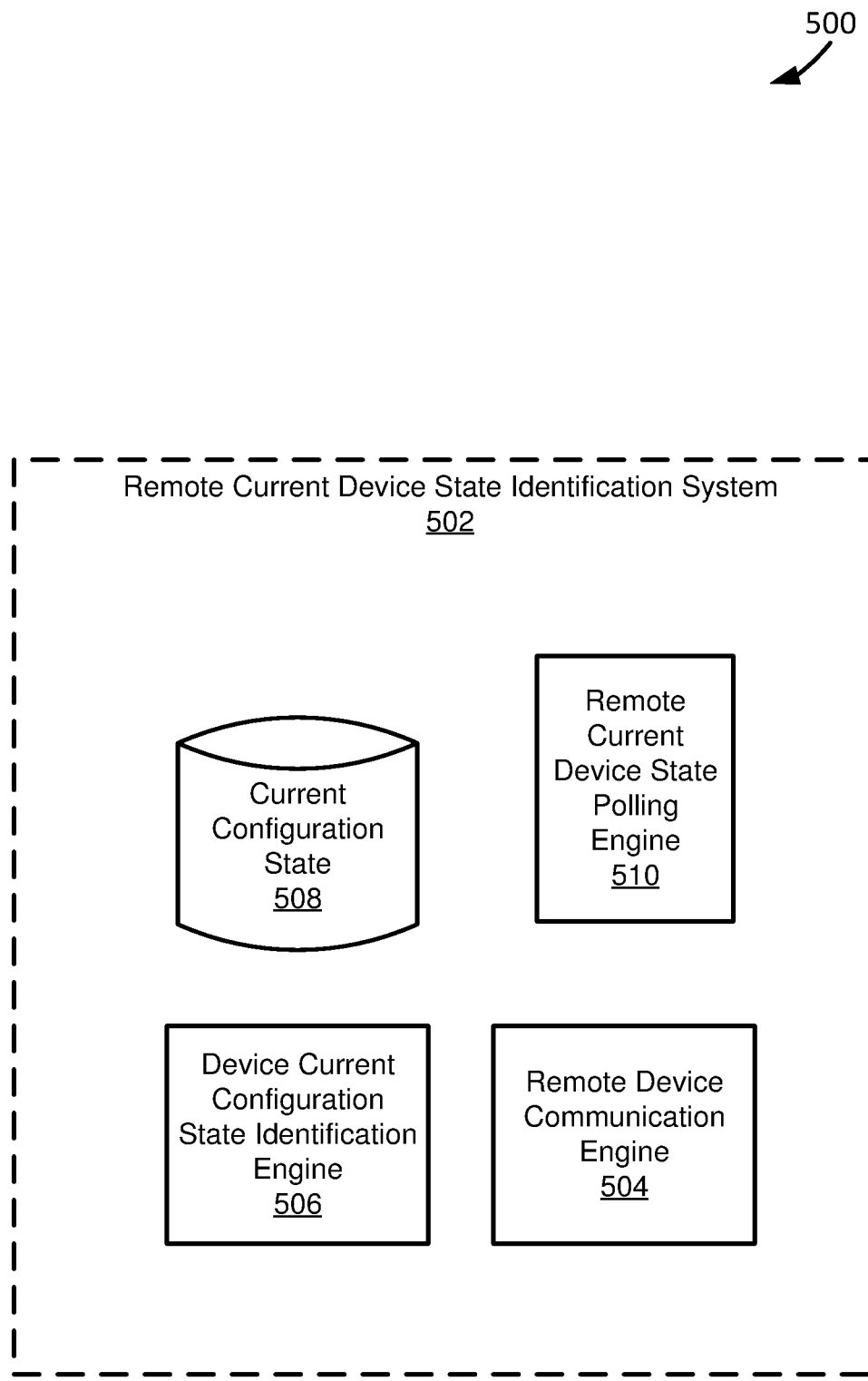
FIG. 5 depicts a diagram of a remote current device state identification system.

FIG. 5 depicts a diagram 500 of a remote current device state identification system 502. The remote current device state identification system 502 is intended to represent a system that functions to determine a state of a device remotely. The remote current device state identification system 502 can determine a device state remotely by querying a device to provide a data stream used in accessing network services or providing access to network services. For example, the remote current device state identification system 502 can query an IoT device to provide a data stream used in accessing network services by the IoT device. In another example, the remote current device state identification system 502 can query an infrastructure network device to provide data streams used in providing IoT devices access to network services. The remote current device state identification system 502 can be integrated as part of an applicable system for remotely managing operation of a device based on a current configuration state of the device, such as the state aware device configuration agnostic mediators described in this paper.

In a specific implementation, the remote current device state identification system 502 functions to query an applicable device to provide a locally maintained current configuration state of a device. The remote current device state identification system 502 can query for current state configuration data one or a combination of a device, a device configured to provide network service access to a device, and a device configured to manage a cluster of devices to provide a locally maintained current configuration state of a device. For example, the remote current device state identification system 502 can query an infrastructure network device configured to manage a cluster of infrastructure network devices for current state configuration data indicating a current configuration state of an infrastructure network device of the infrastructure network devices. In another example, the remote current device state identification system 502 can query an infrastructure network device providing network service access to an IoT device for current state configuration data indicating a current configuration state of the IoT device.

In a specific implementation, the remote current device state identification system 502 functions to vary a frequency at which it queries or polls devices for current configuration state data across a plurality of devices. For example, the remote current device state identification system 502 can poll a first infrastructure network device for current configuration state data every hour and poll a second infrastructure network device for current configuration state data every thirty minutes. The remote current device state identification system 502 can poll devices for current configuration state data at a frequency based on network activity of the devices in providing access to network services or accessing network services. For example, the remote current device state identification system 502 can poll a first infrastructure network device consuming a large amount of bandwidth in providing network services access more frequently than a second infrastructure network device consuming less bandwidth in providing network service access.

In a specific implementation, the remote current device state identification system 502 functions to remotely determine a current configuration state of a device based on data stream received from the device and associated with the device in accessing network services or providing access to network services. For example, the remote current device state identification system 502 can process a data stream used by an IoT device in accessing network services to remotely determine a current configuration state of the IoT device. The remote current device state identification system 502 can use an applicable method to process a data stream in order to determine a current configuration state of a device.

In a specific implementation, the remote current device state identification system 502 functions to disassociate a device from a network. In disassociating a device from a network the remote current device state identification system 502 can subsequently cause the device to re-associate with a network. As part of re-associating with a network, a device can inform the remote current device state identification system 502 of the device's current configuration state. For example, the remote current device state identification system 502 can receive current configuration data from a device indicating a current configuration state of the device when the device associates or re-associates with a network. Current configuration state data received by the remote current device state identification system 502 in response to a device associating or re-associating with a network can indicate a current configuration state of the device is unknown.

In the example of FIG. 5, the example remote current device state identification system 502 includes a remote device communication engine 504, a device current configuration state identification engine 506, a current configuration state datastore 508, and a remote current device state polling engine 510. The remote device communication engine 504 is intended to represent an engine that communicates with devices from a remote source for purposes of managing device operation based on current configuration states of devices. The remote device communication engine 504 can communicate with one or a combination of an infrastructure network device configured to manage a cluster of infrastructure network devices, an infrastructure network device, and an IoT device for purposes of managing devices according to current configuration states. Additionally, the remote device communication engine 504 can communicate with an applicable system implemented at an applicable device for purposes of managing operating of devices based on current configuration states of the devices. For example, the remote device communication engine 504 can communicate with a local state aware device manager for purposes of managing operating of devices based on current configuration states.

In a specific implementation, the remote device communication engine 504 functions to receive current configuration state data from devices indicating current configuration states of devices. For example, the remote device communication engine 504 can receive current configuration state data for an IoT device from an infrastructure network device operating to provide the IoT device access to network services. The remote device communication engine 504 can receive current configuration state data from a device in response to the device being polled or queried for the current configuration state data. The remote device communication engine 504 can communicate with a device as part of querying or polling the device for current configuration state data. The remote device communication engine 504 can query or poll a device in response to instructions. For example, the remote device communication engine 504 can be instructed to poll a device for current configuration state data at a specific time, and subsequently poll the device for the current configuration state data at the specific time.

In a specific implementation, the remote device communication engine 504 functions to remotely receive a data stream associated with a device accessing network services or providing access to network services. For example, the remote device communication engine 504 can receive a data stream associated with an IoT device accessing network services from an infrastructure network device providing, at least in part, the IoT device access to the network services. In another example, the remote device communication engine 504 can receive a data stream associated with an infrastructure network device providing network service access from the infrastructure network device itself. In yet another example, the remote device communication engine 504 can receive a data stream associated with an infrastructure network device providing network service access from device configured to manage a cluster of infrastructure network devices including the infrastructure network device.

In the example of FIG. 5, the device current configuration state identification engine 506 is intended to represent an engine that functions to remotely determine a current configuration state of a device for purposes of managing operation of the device. The device current configuration state identification engine 506 can determine a current configuration state of a device from received current configuration state data for the device. For example, the device current configuration state identification engine 506 can remotely determine a current configuration state of a device from current configuration state data received from a local state aware device manager implemented at an infrastructure network device. In another example, the device current configuration state identification engine 506 can remotely determine a current configuration state of an IoT device from current configuration state data received from a local state aware device manager implemented at an infrastructure network device providing the IoT device access to network services.

In a specific implementation, the device current configuration state identification engine 506 functions to remotely determine a current configuration state of a device based on a received data stream associated with the device either or both accessing network services or providing access to network services. For example, the device current configuration state identification engine 506 can process a data stream used by an infrastructure network device in providing network service access to determine a current configuration state of the infrastructure network device. The device current configuration state identification engine 506 can use an applicable method of processing a data stream associated with providing network service access or accessing network services to determine a current configuration state of a device.

In the example of FIG. 5, the current configuration state datastore 508 is intended to represent a datastore that stores current configuration state data indicating a current configuration state of a device. Current configuration state data stored in the current configuration state datastore 508 can be maintained by an applicable engine for remotely determining a current configuration state of a device, such as the device current configuration state identification engines described in this paper. Current configuration state data stored in the current configuration state datastore 508 can be received from a device in response to polling the device for locally maintained current configuration state data. Additionally, current configuration state data stored in the current configuration state datastore 508 can be remotely generated by remotely determining a current configuration state from either or both received current configuration state data and a data stream associated with a device accessing network services or providing access to network services.

In a specific implementation, the remote current device state polling engine 510 functions to manage polling of devices for locally maintained current configuration state data. The remote current device state polling engine 510 can poll a device by controlling an applicable remote engine for communicating with a device for purposes of managing operation of devices based on current configuration states, such as the remote device communication engines described in this paper. For example, the remote current device state polling engine 510 can determine a specific time to poll a specific device for current configuration state data, and subsequently instruct a remote device communication engine to query the specific device for current configuration state data at the specific time.

In a specific implementation, the remote current device state polling engine 510 functions to vary a frequency at which devices are polled or queried for current configuration state data across a plurality of devices as part of managing polling of devices. For example, the remote current device state polling engine 510 can instruct a remote device communication engine to poll a first infrastructure network device for current configuration state data every hour and poll a second infrastructure network device for current configuration state data every thirty minutes. The remote current device state polling engine 510 can manage a frequency at which devices are polled for current configuration state data based on network activity of the devices in providing access to network services or accessing network services. For example, the remote current device state polling engine 510 can instruct a remote device communication engine to poll a first infrastructure network device consuming a large amount of bandwidth in providing network services access more frequently than a second infrastructure network device consuming less bandwidth in providing network service access.

In a specific implementation, the remote current device state polling engine 510 functions to disassociate a device from a network. In disassociating a device from a network the remote current device state polling engine 510 can subsequently cause the device to re-associate with a network. As part of re-associating with a network, a device can inform the remote current device state identification system 502 of the device's current configuration state. For example, the remote current device state identification system 502 can receive current configuration data from a device indicating a current configuration state of the device when the device re-associates with a network after being dissociated by the remote current device state polling engine 510.

In an example of operation of the system shown in FIG. 5, the remote current device state polling engine 510 determines a specific device to poll for current configuration state data at a specific time. In the example of operation of the example system shown in FIG. 5, the remote device communication engine 504 queries the specific device for the current configuration state data at the specific time. Further, in the example of operation of the example system shown in FIG. 5 the remote device communication engine 504 receives the current configuration state data from the device in response to the query. In the example of operation of the example system shown in FIG. 5, the device current configuration state identification engine 506 remotely determines a current configuration state of a device based on the received current configuration state data. Additionally, in the example of operation of the example system shown in FIG. 5, the device current configuration state identification engine 506 updates current configuration state data stored in the current configuration state datastore 508 to indicate the remotely determined current configuration state of the device.

Figure 6:
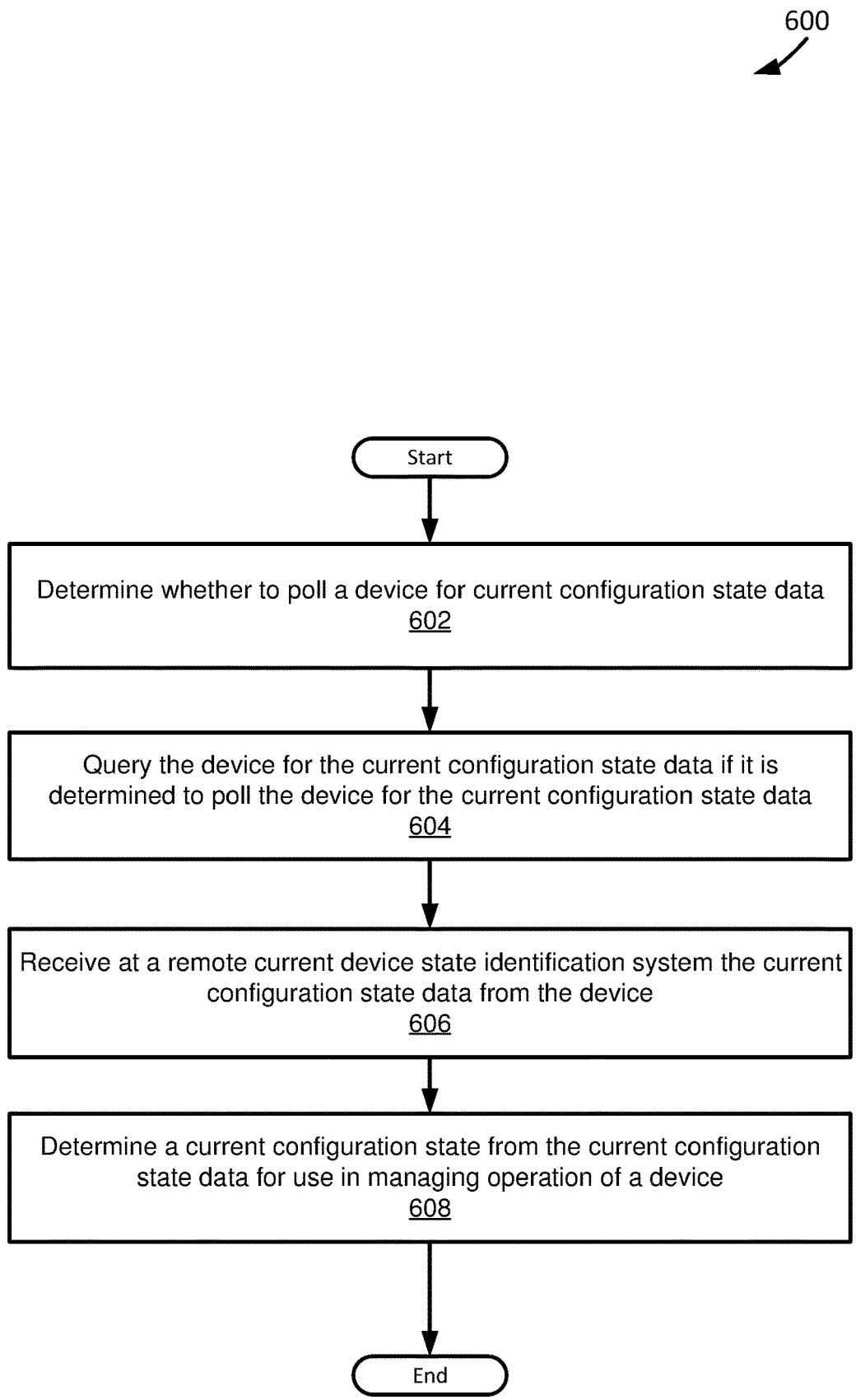
FIG. 6 depicts a flowchart of an example of a method for remotely determining a current configuration state of a device for use in managing operation of the device.

FIG. 6 depicts a flowchart 600 of an example of a method for remotely determining a current configuration state of a device for use in managing operation of the device. The flowchart 600 beings at module 602, where it is determined whether to poll a device for current configuration state data. An applicable engine for remotely controlling polling of devices for current configuration state data, such as the remote current device state polling engines described in this paper, can determined whether to poll a device for current configuration state data. A device for which it is determined whether to poll for current configuration state data can include a device configured to manage a cluster of infrastructure network devices, an infrastructure network device configured to provide network service access, or an IoT device configured to access network services. Whether to poll a device for current configuration state data can be determined based on characteristics of a device that is the subject of the current configuration state data in providing access to network services or accessing network service. For example, if a device that is the subject of the current configuration state data is consuming large amounts of network bandwidth in providing network service access, then it can be determined to poll the device as opposed to another device which is not providing network service access.

The flowchart 600 continues to module 604, where the device is queried for the current configuration state data if it is determined to poll the device for the current configuration state data. An applicable remote engine for communicating with a device for purposes of managing devices based on current configuration states, such as the remote device communication engines described in this paper, can query the device for the current configuration state data. The current configuration state data can be used to identify a current configuration state of the device, another device managed by the device, or another device accessing network services through the device. For example, an infrastructure network device providing an IoT device network service access can be queried for current configuration state data used in identifying a current configuration state of the IoT device.

The flowchart 600 continues to module 606, where the current configuration state data is received at a remote current device state identification system from the device. An applicable remote engine for communicating with a device for purposes of managing devices based on current configuration states, such as the remote device communication engines described in this paper, can receive the current configuration state data from the device at a remote current device state identification system. The current configuration state data can be received from the device as part of the device associating or re-associating with a network. For example, the current configuration state data can be received from the device as part of the device re-associating with a network after being forced to disassociate from the network.

The flowchart 600 continues to module 608, where a current configuration state is remotely determined from the current configuration state data for use in managing operation of a device. An applicable engine for determining a current configuration state of a device, such as the device current configuration state identification engines described in this paper can remotely determine a current configuration state of a device from the current configuration state data. A current configuration state for the device from which the current configuration state data is received can be determined from the current configuration state data. Alternatively a current configuration state for a device accessing network services through the device from which the current configuration state data is received can be determined from the current configuration state data.

Figure 7:
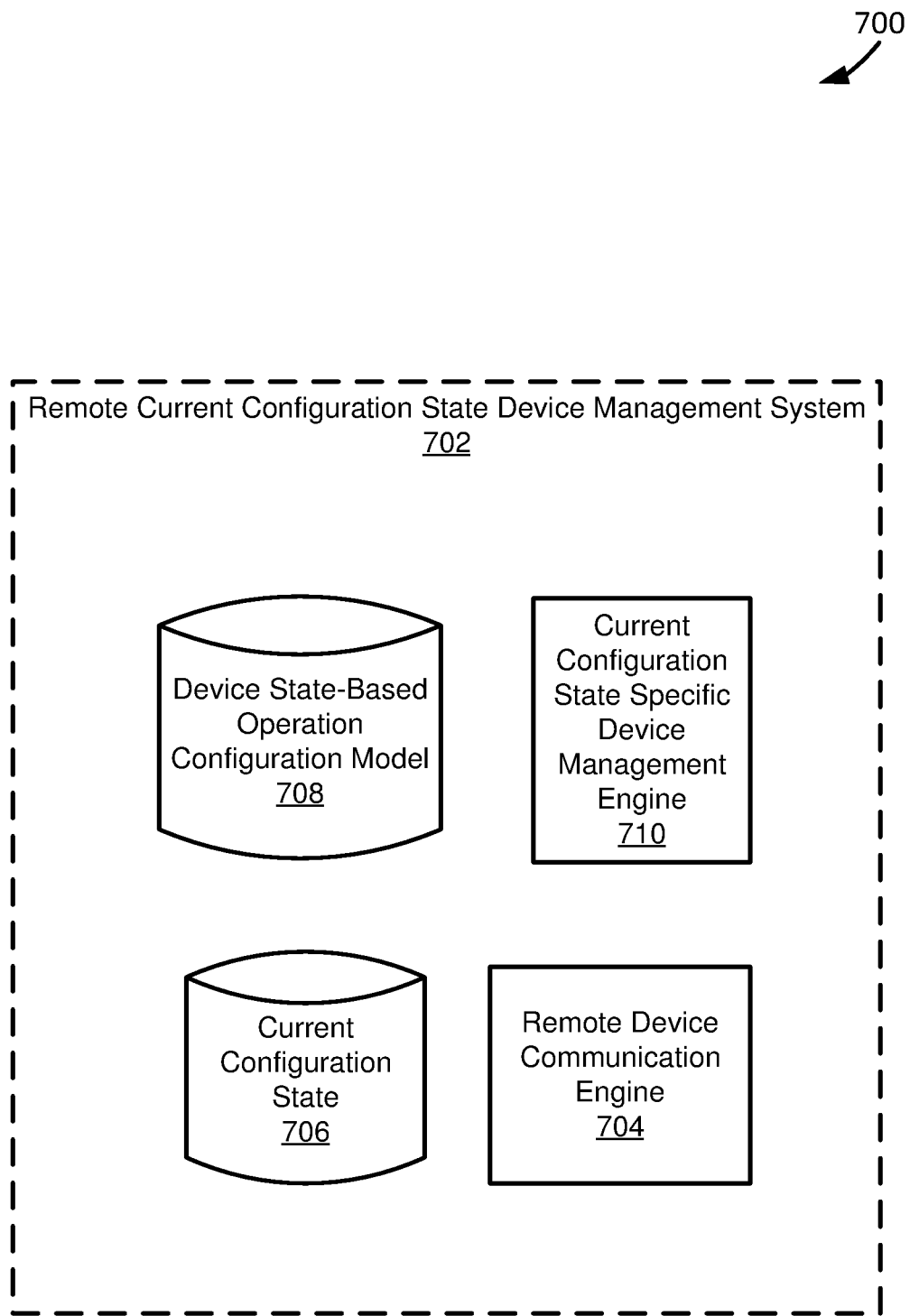
FIG. 7 depicts a diagram of an example of a remote current configuration state device management system.

FIG. 7 depicts a diagram 700 of an example of a remote current configuration state device management system 702. The remote current configuration state device management system 702 is intended to represent a system that functions to remotely manage operation of a device based on a current configuration state at which the device is operating. The remote current configuration state device management system 702 can be part of an applicable system for managing device operation based on a current configuration state, such as the state aware device configuration agnostic mediators described in this paper. The remote current configuration state device management system 702 can manage operation of a device using one or a combination of a device configured to manage a cluster of devices including the managed device, an infrastructure network device configured to provide network service access to IoT devices, and IoT devices themselves. For example, the remote current configuration state device management system 702 can manage operation of an IoT device based on a current configuration state of the device using the IoT device itself. In another example, the remote current configuration state device management system 702 can manage operation of an IoT device based on a current configuration state of the IoT device using an infrastructure network device providing the IoT device access to network services.

In a specific implementation, the remote current configuration state device management system 702 functions to remotely generate desired configuration instructions for controlling operation of a device based on a current configuration state. The remote current configuration state device management system 702 can generate desired configuration instructions based on a current configuration state of a device. For example, the remote current configuration state device management system 702 can generate desired configuration instructions to cause a device to switch from operating at a current configuration state to a desired configuration state. Additionally, the remote current configuration state device management system 702 can generate desired configuration instructions based on user input. For example, a network supervisor can provide user input indicating a desired configuration state and the remote current configuration state device management system 702 can subsequently generate desired configuration instructions based on the desired configuration state and a current configuration state of a device. The remote current configuration state device management system 702 can provide generated desired configuration instructions to an applicable system for locally controlling operation of a device based on a current configuration state, such as the local state aware device managers described in this paper.

In a specific implementation, the remote current configuration state device management system 702 functions to remotely generate desired configuration instructions using a device state-based operation configuration model. In using a device state-based operation configuration model, the remote current configuration state device management system 702 can query current configuration states and desired configurations states to determine specific instructions to cause a device to switch from a current configuration state to a desired configuration state. The remote current configuration state device management system 702 can select a device state-based operation configuration model to use in generating desired configuration instructions based on one or a combination of a specific device, a specific type of device, operation of a device in accessing network services, and operation of a device in providing access to network services. For example, if the remote current configuration state device management system 702 is generating desired configuration instructions for controlling a specific type of device, then the remote current configuration state device management system 702 can apply a device state-based operation configuration model used in controlling operation of devices of the specific type.

In the example of FIG. 7, the remote current configuration state device management system 702 includes a remote device communication engine 704, a current configuration state datastore 706, a device state-based operation configuration model datastore 708, and a current configuration state specific device management engine 710. The remote device communication engine 704 is intended to represent an applicable engine that functions to communicate from a remote source for purposes of control operation of devices based on current configuration states, such as the remote device communication engines described in this paper. The remote device communication engine 704 can communicate with one or a combination of an infrastructure network device configured to manage a cluster of infrastructure network devices, an infrastructure network device, and an IoT device for purposes of managing devices according to current configuration states. Additionally, the remote device communication engine 704 can communicate with an applicable system implemented at an applicable device for purposes of managing operating of devices based on current configuration states of the devices. For example, the remote device communication engine 704 can communicate with a local state aware device manager for purposes of managing operating of devices based on current configuration states. The remote device communication engine can receive user input from a user indicating a desired configuration state for a device.

In a specific implementation, the remote device communication engine 704 functions to provide desired configuration instructions for use in controlling operation of a device based on a current configuration state. The remote device communication engine 704 can provide desired configuration instructions to an applicable local system for controlling operation of a device based on a current configuration state, such as the local state aware device managers described in this paper. Subsequently, a local state aware device manager receiving desired configuration instructions from the remote device communication engine 704 can use the instructions to configure a device to operate at a desired configuration state.

In the example of FIG. 7, the current configuration state datastore 706 is intended to represent a datastore that remotely stores current configuration state data indicating a current configuration state of a device, such as the current configuration state datastores described in this paper. Current configuration state data stored in the current configuration state datastore 706 can be maintained by an applicable engine for remotely determining a current configuration state of a device, such as the device current configuration state identification engines described in this paper. Current configuration state data stored in the current configuration state datastore 706 can be maintained based on a data stream associated with a device accessing network services or providing access to network services. Additionally, current configuration state data stored in the current configuration state datastore 706 can be maintained based on current configuration data received from a local system for managing device operation based on a current configuration state, such as the local state aware device managers described in this paper.

In the example of FIG. 7, the device state-based operation configuration model datastore 708 is intended to represent a datastore that functions to store device state-based operation configuration model data. Device state-based operation configuration model data stored in the device state-based operation configuration model datastore 708 can include a device state-based operation configuration model mapping configuration instructions to configuration states the configuration instructions cause a device to switch between in operation. Additionally, device state-based operation configuration model data stored in the device state-based operation configuration model datastore 708 can include metadata about different operation models. For example, device state-based operation configuration model data stored in the device state-based operation configuration model datastore 708 can include one or a combination of a specific device, a specific type of device, operation of a device in accessing network services, and operation of a device in providing access to network services associated with a specific model.

In the example of FIG. 7, the current configuration state specific device management engine 710 is intended to represent an engine that functions to remotely control configuring of a device based on a current configuration state of the device. In controlling configuring of a device based on a current configuration state of the device, the current configuration state specific device management engine 710 can generate desired configuration instructions used in configuring the device to operate based on a current configuration state of the device. The current configuration state specific device management engine 710 can generate desired configuration instructions based on a current configuration state of a device. For example, the current configuration state specific device management engine 710 can generate current configuration instructions to cause a device to switch from operating at a current configuration state. Additionally, the current configuration state specific device management engine 710 can generate desired configuration instructions based on user input. For example, if user input indicates a desired configuration state for a device, then the current configuration state specific device management engine 710 can generate desired configuration instructions to cause a device to switch to operating at the desired configuration state, as indicated by the input.

In remotely controlling configuring of a device, the current configuration state specific device management engine 710 functions to instruct an applicable communication engine to provide generated desired configuration instructions. For example, the current configuration state specific device management engine 710 can instruct the remote device communication engines described in this paper to provide generated desired configuration instructions. Additionally, the current configuration state specific device management engine 710 can instruct an applicable communication engine to provide generated desired configuration instructions to an applicable system for locally controlling operation of a device based on a current configuration state, such as the local state aware device managers described in this paper.

In a specific implementation, the current configuration state specific device management engine 710 functions to use a device state-based operation configuration model to generate desired configuration instructions. In using a device state-based operation configuration model, the current configuration state specific device management engine 710 can query current configuration states and desired configurations states to determine specific instructions to cause a device to switch from a current configuration state to a desired configuration state. The current configuration state specific device management engine 710 can select a device state-based operation configuration model to use in generating desired configuration instructions based on one or a combination of a specific device, a specific type of device, operation of a device in accessing network services, and operation of a device in providing access to network services. For example, if the current configuration state specific device management engine 710 is generating desired configuration instructions for controlling a specific type of device, then the current configuration state specific device management engine 710 can apply a device state-based operation configuration model used in controlling operation of devices of the specific type.

In an example of operation of the remote current configuration state device management system 702 shown in FIG. 7, the current configuration state datastore 706 remotely stores current configuration state data indicating a current configuration state of a device. In the example of operation of the example system shown in FIG. 7, the device state-based operation configuration model datastore 708 stores device state-based operation configuration model data indicating device state-based operation configuration models for use in controlling operation of devices based on current configuration states of the devices. Further, in the example of operation of the example system shown in FIG. 7, the current configuration state specific device management engine 710 uses the device state-based operation configuration model data stored in the device state-based operation configuration model datastore 708 to select a device state-based operation configuration model to use in controlling operation of the device based on the current configuration state.

In the example of operation of the example system shown in FIG. 7, the current configuration state specific device management engine 710 uses the selected device state-based operation configuration model and the current configuration state of the device to generate desired configuration instructions. Further, in the example of operation of the example system shown in FIG. 7, the current configuration state specific device management engine 710 instructs the remote device communication engine 704 to send the instructions to a local state aware device manager for use in configuring the device to operate at a desired configuration state using the desired configuration instructions. In the example of operation of the example system shown in FIG. 7, the remote device communication engine 704 sends the desired configuration instructions generated by the current configuration state specific device management engine 710 to the local state aware device manager.

Figure 8:
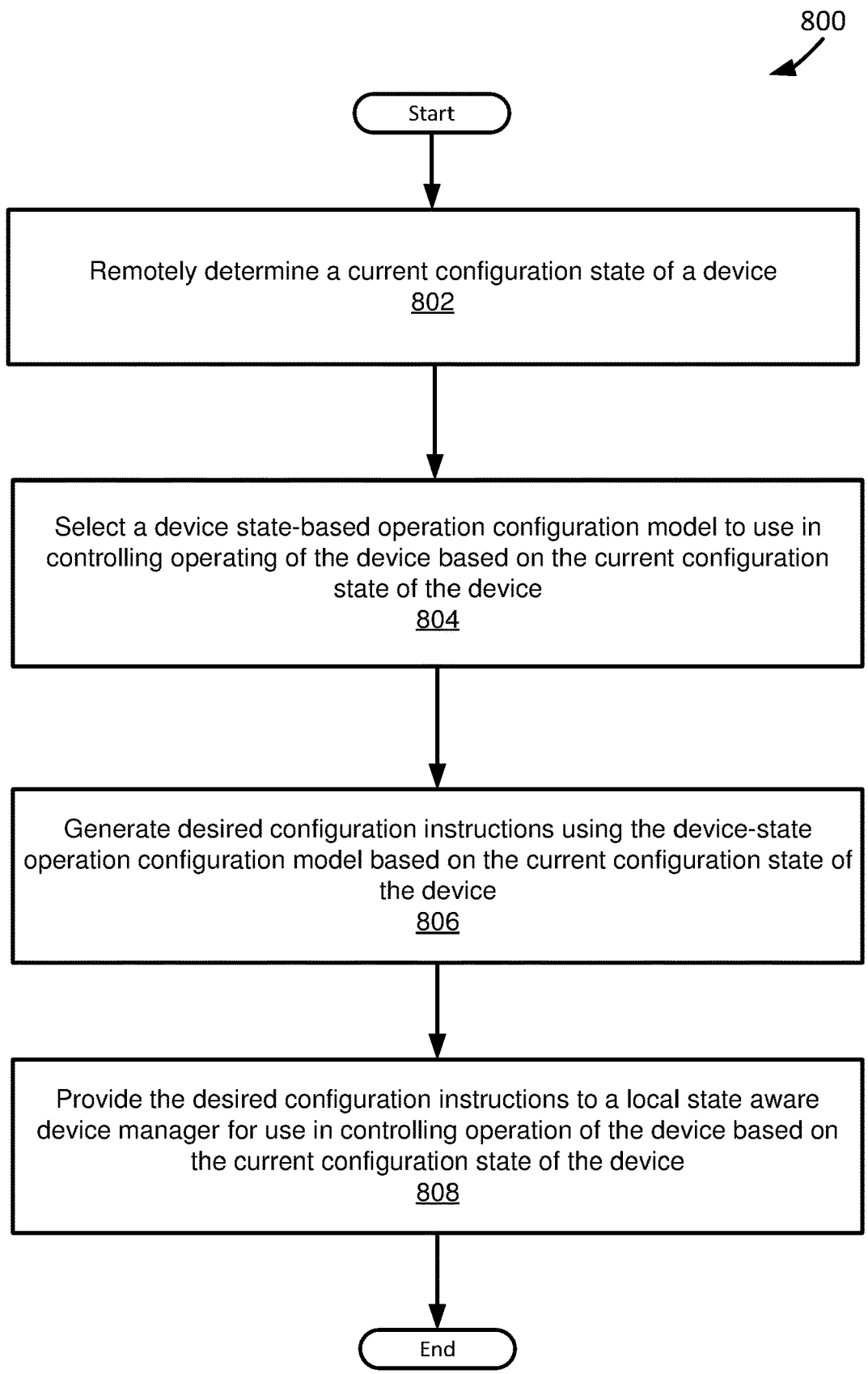
FIG. 8 depicts a flowchart of an example of a method for controlling operation of a device remotely based on a current configuration state of the device.

FIG. 8 depicts a flowchart 800 of an example of a method for controlling operation of a device remotely based on a current configuration state of the device. The flowchart 800 begins at module 802, where a current configuration state of a device is determined. A current configuration state of a device can be determined by an applicable engine for remotely determining a current configuration state of a device, such as the device current configuration state identification engines described in this paper. A current configuration state of a device can be remotely determined from current configuration state data received from an applicable system for locally managing operation of a device according to a current configuration state of the device, such as the local state aware device mangers described in this paper. Additionally, a current configuration state of a device can be remotely determined from a data stream associated with a device providing access to network services or accessing network services.

The flowchart 800 continues to module 804, where a device state-based operation configuration model to use in controlling operation of the device based on the current configuration state of the device is selected. An applicable engine for managing control of operation of a device based on a current configuration state of the device, such as the current configuration state specific device management engines described in this paper, can select a device state-based operation configuration model to use in controlling operation of the device based on the current configuration state. A device state-based operation configuration model to use in controlling operation of the device can be selected based on one or a combination of a specific device, a specific type of device, operation of a device in accessing network services, and operation of a device in providing access to network services.

The flowchart 800 continues to module 806, where desired configuration instructions are generated using the device state-based operation configuration model based on the current configuration state of the device. An applicable engine for managing control of operation of a device based on a current configuration state of the device, such as the current configuration state specific device management engines described in this paper, can generate desired configuration instructions using the device state-based operation configuration model based on the current configuration state of the device. Desired configuration instructions can be generated through user input received indicating a desired configuration state of the device.

The flowchart 800 continues to module 808, where the desired configuration instructions are provided to a local state aware device manager for use in controlling operation of the device based on the current configuration state of the device. An applicable remote engine for communicating for purposes of controlling operation of a device based on a current configuration state of the device, such as the remote device communication engines described in this paper, can provide the desired configuration instructions to a local state aware device manager for use in controlling operation of the device based on the current configuration state of the device. A local state ware device manager can use received desired configuration instructions to locally configure the device to operate at a desired configuration state.

Figure 9:
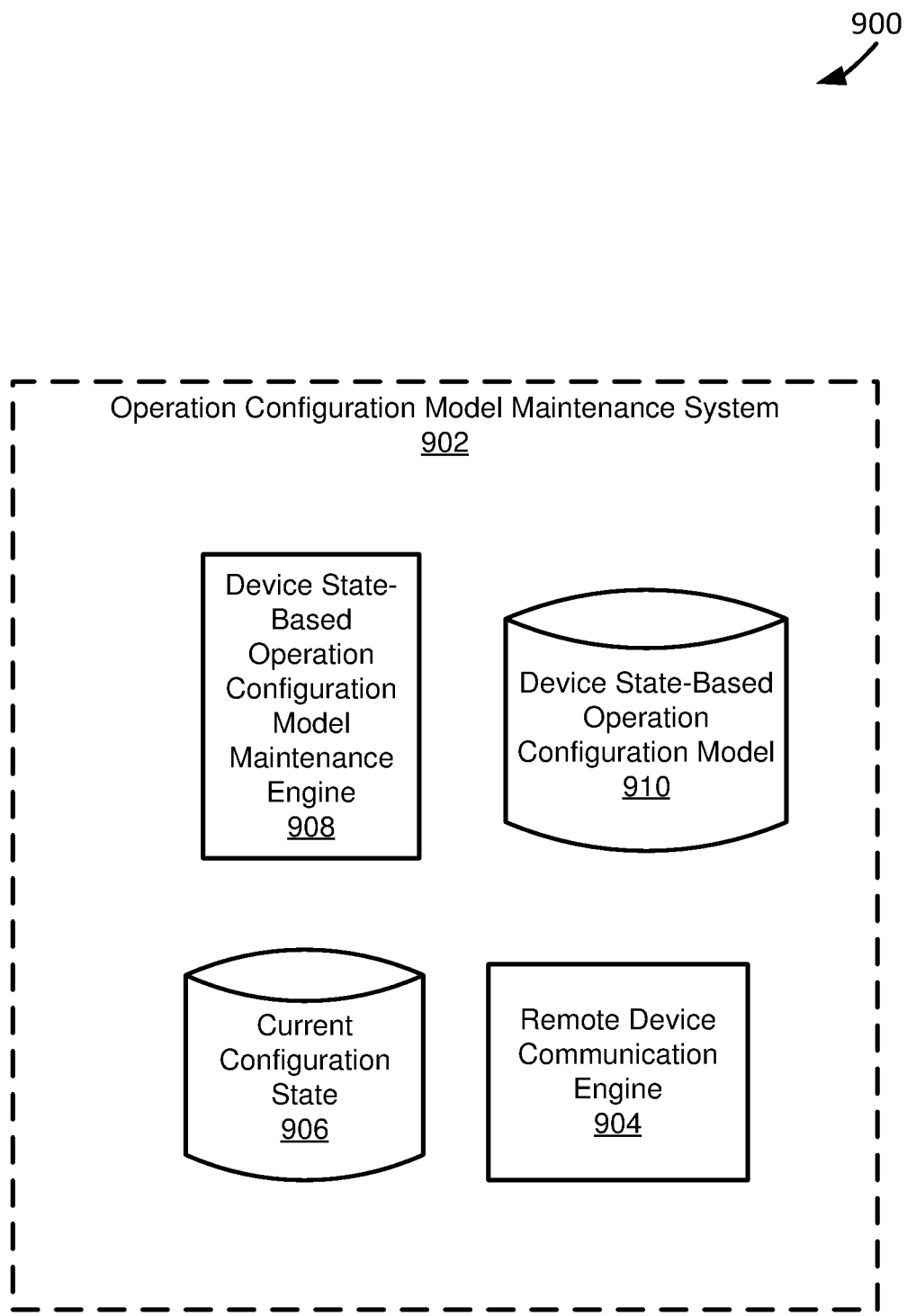
FIG. 9 depicts a diagram of an example of an operation configuration model maintenance system.

FIG. 9 depicts a diagram 900 of an example of an operation configuration model maintenance system 902. The operation configuration model maintenance system 902 is intended to represent a system that functions to maintain a device state-based operation configuration model for use in configuring a device to operate according to a current configuration state. The operation configuration model maintenance system 902 can be included as part of an applicable system for locally managing operation of a device using a current configuration state of the device, such as the local state aware device managers described in this paper. Additionally, the operation configuration model maintenance system 902 can be included as part of an applicable system for remotely managing operation of a device using a current configuration state of the device, such as the state aware device configuration agnostic mediators described in this paper.

In a specific implementation, the operation configuration model maintenance system 902 functions to maintain device state-based operation configuration model data indicating a device state-based operation configuration model. The operation configuration model maintenance system 902 can maintain device state-based operation configuration model data based on specific configuration instructions used to configure a device to operate. Additionally, the operation configuration model maintenance system 902 can maintain device state-based operation configuration model based on observed device configuration states achieved at a device in response to specific configuration instructions. For example, the operation configuration model maintenance system 902 can generate a mapping of specific configuration instructions to specific observed device configuration states achieved in response to the specific configuration instructions.

In a specific implementation, the operation configuration model maintenance system 902 functions to maintain metadata about device state-based operation configuration models in maintaining device state-based operation configuration model data. The operation configuration model maintenance system 902 can generate metadata for operation configuration models based on one or a combination of a specific device, a specific device type, characteristics related to a device providing network service access, and characteristics related to a device accessing network services. For example, the operation configuration model maintenance system 902 can generate metadata indicating a model is for a specific device. In another example, the operation configuration model maintenance system 902 can generate metadata indicating a model is for a device providing accessing to network services according to specific characteristics.

The example operation configuration model maintenance system 902 shown in FIG. 9 includes a remote device communication engine 904, a current configuration state datastore 906, a device state-based operation configuration model maintenance engine 908, and a device state-based operation configuration model datastore 910. The remote device communication engine 904 is intended to represent a remote engine that functions to communicate with local systems for purposes of controlling operation of a device locally according to a current configuration state, such as the remote device communication engines described in this paper. The remote device communication engine 904 can communicate with an applicable system for locally managing operation of a device according to a current configuration state of a device, such as the local state aware device managers described in this paper. The remote device communication engine 904 can communicate with one or a combination of an infrastructure network device configured to manage a cluster of infrastructure network devices, an infrastructure network device, and an IoT device for purposes of managing devices according to current configuration states.

In a specific implementation, the remote device communication engine 904 functions to receive current configuration state data from devices indicating current configuration states of devices. For example, the remote device communication engine 904 can receive current configuration state data for an IoT device from an infrastructure network device operating to provide the IoT device access to network services. The remote device communication engine 904 can receive current configuration state data from a device in response to the device being polled or queried for the current configuration state data. The remote device communication engine 904 can communicate with a device as part of querying or polling the device for current configuration state data. The remote device communication engine 904 can query or poll a device in response to instructions. For example, the remote device communication engine 904 can be instructed to poll a device for current configuration state data at a specific time, and subsequently poll the device for the current configuration state data at the specific time.

In a specific implementation, the remote device communication engine 904 functions to remotely receive a data stream associated with a device accessing network services or providing access to network services. For example, the remote device communication engine 904 can receive a data stream associated with an IoT device accessing network services from an infrastructure network device providing, at least in part, the IoT device access to the network services. In another example, the remote device communication engine 904 can receive a data stream associated with an infrastructure network device providing network service access from the infrastructure network device itself. In yet another example, the remote device communication engine 904 can receive a data stream associated with an infrastructure network device providing network service access from device configured to manage a cluster of infrastructure network devices including the infrastructure network device.

In a specific implementation, the remote device communication engine 904 functions to provide desired configuration instructions for use in controlling operation of a device based on a current configuration state. The remote device communication engine 904 can provide desired configuration instructions to an applicable local system for controlling operation of a device based on a current configuration state, such as the local state aware device managers described in this paper. Subsequently, a local state aware device manager receiving desired configuration instructions from the remote device communication engine 904 can use the instructions to configure a device to operate at a desired configuration state.

In the example of FIG. 9, the current configuration state datastore 906 is intended to represent a datastore that functions to store current configuration state data of a device, such as the current configuration datastores described in this paper. The current configuration state datastore 906 can store current configuration state data maintained by an applicable engine for maintaining current configuration state data of a device, such as the device current configuration state identification engines described in this paper. For example current configuration state data stored in the current configuration state datastore 906 can indicate a current configuration state of a device in response to being locally configured according to configuration instructions, e.g. desired configuration instructions used to configured a device to operate based on a current configuration state of the device.

In the example of FIG. 9, the device state-based operation configuration model maintenance engine 908 is intended to represent an engine that functions to maintain a device state-based operation configuration model. A device state-based operation configuration model maintained by the device state-based operation configuration model maintenance engine 908 can be used to control operation of a device based on a current configuration state of a device. Specifically, a device state-based operation configuration model maintained by the device state-based operation configuration model maintenance engine 908 can include a mapping of specific operation configuration instructions to observed configuration states in devices in response to being configured according to the specific operation configuration instructions. In maintaining a device state-based operation configuration model, the device state-based operation configuration model maintenance engine 908 can functions to maintain device state-based operation configuration model data. Device state-based operation configuration model data can indicate a specific device state-based operation configuration model.

In a specific implementation, the device state-based operation configuration model maintenance engine 908 functions to maintain a device state-based operation configuration model based on sent configuration instructions. For example, the device state-based operation configuration model maintenance engine 908 can maintain a device state-based operation configuration model by including in a mapping configuration instructions sent to a device, e.g. as part of desired configuration instructions. The device state-based operation configuration model maintenance engine 908 can maintain a device state-based operation configuration model based on a plurality of configuration instructions sent to one or a plurality of devices. For example, the device state-based operation configuration model maintenance engine 908 can maintain a device state-based operation configuration model by including in a mapping a sequence of configuration instructions sent to one or a plurality of devices.

In a specific implementation, the device state-based operation configuration model maintenance engine 908 functions to maintain a device state-based operation configuration model based on current configuration states observe at devices in response to configuration instructions. For example, the device state-based operation configuration model maintenance engine 908 can maintain a device state-based operation configuration model including a mapping of configuration instructions sent to a device and an observed configuration state achieved at the device in response to the device being configuration according the configuration instructions. The device state-based operation configuration model maintenance engine 908 can maintain a device state-based operation configuration model based on a plurality of configuration states achieved at a device in response to a plurality of configuration instructions used in configuring the device to operate. Further, the device state-based operation configuration model maintenance engine 908 can maintain a device state-based operation configuration model based on a plurality of configuration states achieved at a plurality of devices in response to a plurality of configuration instructions used in configuring the devices to operate.

In a specific implementation, the device state-based operation configuration model maintenance engine 908 functions to maintain device state-based operation configuration model data including metadata about a device state-based operation configuration model. The device state-based operation configuration model maintenance engine 908 can generate metadata about a device state-based operation configuration model according to one or a combination of a specific device, a device type of a device, characteristics of a device in providing access to network services, and characteristics of a device in accessing network services. For example, the device state-based operation configuration model maintenance engine 908 can maintain metadata indicating a device state-based operation configuration model was created for a specific type of device. In another example, the device state-based operation configuration model maintenance engine 908 can maintain metadata indicating a device state-based operation configuration model was created for devices accessing specific network services.

In the example of FIG. 9, the device state-based operation configuration model datastore 910 is intended to represent an applicable datastore that stores device state-based operation configuration model data, such as the device state-based operation configuration model datastores described in this paper. An applicable engine for maintaining device state-based operation configuration model data, such as the device state-based operation configuration model maintenance engines described in this paper, can maintain device state-based operation configuration model data stored in the device state-based operation configuration model datastore 910. Data stored in the device state-based operation configuration model datastore 910 can include models used in configuring devices according to current configuration states. Additionally, data stored in the device state-based operation configuration model datastore 910 can include metadata about specific device state-based operation configuration models.

In an example of operation of the operation configuration model maintenance system shown in FIG. 9, the remote device communication engine 904 sends configuration instructions, e.g. desired configuration instructions, for use in configuring a device to operate. In the example of operation of the example system shown in FIG. 9, the current configuration state datastore 906 stores current configuration data indicating determined configuration states observed at the device in response to the device configured to operate according to the configuration instructions. Further, in the example of operation of the example system shown in FIG. 9, the device state-based operation configuration model maintenance engine 908 maintains a device state-based operation configuration model based on the configuration instructions used in configuring the device to operate and the determined configuration states observed at the device in response to the device being configured to operate according to the configuration instructions.

Figure 10:
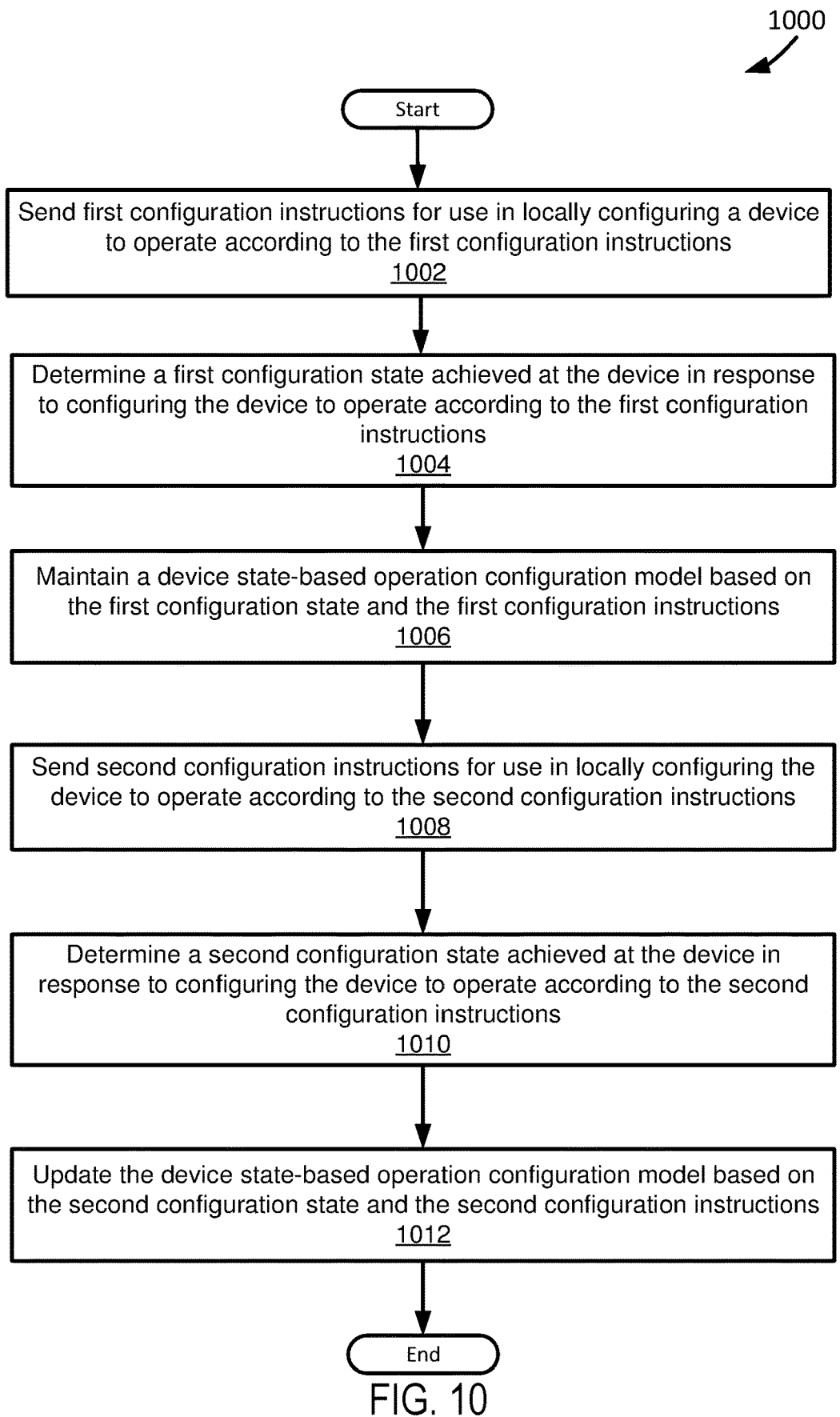
FIG. 10 depicts a flowchart of an example of a method of maintaining a device state-based operation configuration model for use in controlling operation of a device according to a current configuration state of the device.

FIG. 10 depicts a flowchart 1000 of an example of a method of maintaining a device state-based operation configuration model for use in controlling operation of a device according to a current configuration state of the device. The flowchart 1000 begins at module 1002, where first configuration instructions are sent for use in locally configuring a device to operate according to the first configuration instructions. An applicable engine for generating configuration instructions for configuring a device based on a current configuration state of a device, such as the current configuration state specific device management engines described in this paper, can generate first configuration instructions for use in locally configuring a device to operate according to the first configuration instructions. First configuration instructions can be generated based on an unknown current configuration state of a device, e.g. a null value for a current configuration state. An applicable remote engine for sending configuration instructions, such as the remote device communication engines described in this paper, can send first configuration instructions for use in locally configuring a device to operate according to the first configuration instructions.

The flowchart 1000 continues to module 1004, where a first configuration state achieved at the device in response to configuring the device to operate according to the first configuration instructions is determined. An applicable engine for determining a current configuration state of a device in operation, such as the device current configuration state identification engines described in this paper, can determine a first configuration state achieved at the device in response to configuring the device to operate according to the first configuration instructions. A first configuration state achieved at the device in response to configuring the device to operate according to the first configuration instructions can be determined either or both locally with respect to the device or remotely from the device. Additionally, a first configuration state achieved at the device in response to configuring the device to operate according to the first configuration instructions can be determined based on a data stream flowing through the device in accessing network services or providing access to network services.

The flowchart 1000 continues to module 1006, where a device state-based operation configuration model is maintained based on the first configuration state and the first configuration instructions. An applicable engine for maintaining device state-based operation configuration models used in configuring devices according to current configuration states, such as the device state-based operation configuration model maintenance engines described in this paper, can maintain a device state-based operation configuration model according to the first configuration state and the first configuration instructions. A device state-based operation configuration model can include a mapping of the first configuration instructions to causing a state change in a device from a specific configuration state, potentially an unknown configuration state, to the first configuration state.

The flowchart 1000 continues to module 1008, where second configuration instructions for use in locally configuring the device to operate according to the second configuration instructions are provided. An applicable engine for generating configuration instructions for configuring a device based on a current configuration state of a device, such as the current configuration state specific device management engines described in this paper, can generate second configuration instructions for use in locally configuring the device to operate according to the second configuration instructions. Second configuration instructions can be generated based on the first current configuration state of the device. An applicable remote engine for sending configuration instructions, such as the remote device communication engines described in this paper, can send second configuration instructions for use in locally configuring the device to operate according to the second configuration instructions.

The flowchart 1000 continues to module 1010, where a second configuration state achieved at the device in response to configuring the device to operate according to the second configuration instructions is determined. An applicable engine for determining a current configuration state of a device in operation, such as the device current configuration state identification engines described in this paper, can determine a second configuration state achieved at the device in response to configuring the device to operate according to the second configuration instructions. A second configuration state achieved at the device in response to configuring the device to operate according to the second configuration instructions can be determined either or both locally with respect to the device or remotely from the device. Additionally, a second configuration state achieved at the device in response to configuring the device to operate according to the second configuration instructions can be determined based on a data stream flowing through the device in accessing network services or providing access to network services.

The flowchart 1000 continues to module 1012, where the device state-based operation configuration model is updated based on the second configuration state and the second configuration instructions. An applicable engine for maintaining device state-based operation configuration models used in configuring devices according to current configuration states, such as the device state-based operation configuration model maintenance engines described in this paper, can update the device state-based operation configuration model according to the second configuration state and the second configuration instructions. The device state-based operation configuration model can be updated to include a mapping of the second configuration instructions to causing a state change in a device from the first configuration state to the second configuration state.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

We claim:

1. A method, comprising:
   receiving, at a local state aware device manager, a data stream from a device in a network;
   determining, at the local state aware device manager, a current configuration state of the device based on the data stream;
   remotely identifying, at a state aware mediator, a desired configuration state of the device;
   receiving, at the state aware mediator, current configuration state data indicating the current configuration state of the device;
   generating, at the state aware mediator, desired configuration instructions for use in configuring the device to operate at the desired configuration state based on the current configuration state of the device indicated by the current configuration state data and the desired configuration state of the device;
   providing the desired configuration instructions from the state aware mediator to the local state aware device manager; and
   locally arranging the device to operate at the desired configuration state using the desired configuration instructions based on a control and provisioning of wireless access points.

2. The method of claim 1, wherein the device is an Internet of Things (IoT) device and the local state aware device manager is implemented at an infrastructure network device configured to provide the IoT device access to network services.

3. The method of claim 1, wherein the device is an infrastructure network device and the local state aware device manager is implemented at a network device configured to manage a cluster of infrastructure network devices including the infrastructure network device.

4. The method of claim 1, wherein the device is an infrastructure network device configured to provide IoT devices access to network services through wireless connections.

5. The method of claim 1, further comprising:
   configuring, based on user input, the device to provide access to network services through the network or access the network services through the network; and
   identifying, at the state aware mediator, the desired configuration state of the device based on the user input.

6. The method of claim 1, further comprising:
   using a device state-based operation configuration model to identify configuration instructions based on the desired configuration state and the current configuration state of the device; and
   generating, at the state aware mediator, the desired configuration instructions based on the configuration instructions identified from the device state-based operation configuration model.

7. The method of claim 1, further comprising:
   selecting a device state-based operation configuration model based on one or a combination of an identification of the device, a device type of the device, characteristics of the device in operating to provide access to network services through the network, and characteristics of the device in operating to access the network services through the network;
   using the device state-based operation configuration model to identify configuration instructions based on the desired configuration state and the current configuration state of the device; and
   generating, at the state aware mediator, the desired configuration instructions based on the configuration instructions identified from the device state-based operation configuration model.

8. The method of claim 1, further comprising:
   maintaining a device state-based operation configuration model based on different configuration state changes achieved at another device in response to the device operating based on different configuration instructions;
   using the device state-based operation configuration model to identify configuration instructions based on the desired configuration state and the current configuration state of the device; and
   generating, at the state mediator, the desired configuration instructions based on the configuration instructions identified from the device state-based operation configuration model.

9. The method of claim 1, further comprising:
   determining, at the state aware mediator, whether to poll the local state aware device manager for the current configuration state of the device in operation to either provide access to network services through the network or access the network services through the network;
   querying the local state aware device manager for the current configuration state of the device; and
   receiving, from the local state aware device manager and at the state aware mediator, the current configuration state data indicating the current configuration state of the device in response to querying the local state aware device manager for the current configuration state of the device.

10. A system, comprising:
a device communication engine configured to receive a data stream from a device in a network and to provide current configuration state data indicating a current configuration state of the device to a state aware mediator;
a device configuration state identification engine configured to determine the current configuration state of the device based on the data stream;
a configuration state device management engine configured to:
   remotely identify, at the state aware mediator, a desired configuration state of the device;
   generate, at the state aware mediator, desired configuration instructions for use in configuring the device to operate at the desired configuration state based on the current configuration state of the device indicated by the current configuration state data and the desired configuration state of the device;
a device communication engine configured to provide the desired configuration instructions from the state aware mediator to a state aware device manager; and
a device configuration engine configured to arrange the device to operate at the desired configuration state using the desired configuration instructions based on a control and provisioning of wireless access points.

11. The method of claim 10, wherein the device is an Internet of Things (IoT) device and the state aware device manager is implemented at an infrastructure network device configured to provide the IoT device access to network services.

12. The system of claim 10, wherein the device is an infrastructure network device and the state aware device manager is implemented at a network device configured to manage a cluster of infrastructure network devices including the infrastructure network device.

13. The system of claim 10, wherein the device is an infrastructure network device configured to provide IoT devices access to network services through wireless connections.

14. The system of claim 10, wherein:
the device communication engine is further configured to configure, based on user input, the device to provide access to network services through the network or access the network services through the network, and
the configuration state device management engine is further configured to identify the desired configuration state of the device based on the user input.

15. The system of claim 10, wherein the configuration state device management engine is further configured to:
use a device state-based operation configuration model to identify configuration instructions based on the desired configuration state and the current configuration state of the device; and
generate the desired configuration instructions based on the configuration instructions identified from the device state-based operation configuration model.

16. The system of claim 10, wherein the configuration state device management engine is further configured to:
select a device state-based operation configuration model based on one or a combination of an identification of the device, a device type of the device, characteristics of the device in operating to provide access to network services through the network, and characteristics of the device in operating to access the network services through the network;
use the device state-based operation configuration model to identify configuration instructions based on the desired configuration state and the current configuration state of the device; and
generate the desired configuration instructions based on the configuration instructions identified from the device state-based operation configuration model.

17. The system of claim 10, further comprising a maintenance engine configured to maintain a device state-based operation configuration model based on different configuration state changes achieved at another device in response to the device operating based on different configuration instructions, wherein the configuration state device management engine is further configured to:
use the device state-based operation configuration model to identify configuration instructions based on the desired configuration state and the current configuration state of the device; and
generate desired configuration instructions based on the configuration instructions identified from the device state-based operation configuration model.

18. The method of claim 1, wherein the data stream comprises data related to the device accessing one or more network services.

19. The system of claim 10, wherein the data stream comprises data related to the device accessing one or more network services.

20. A non-transitory computer readable storage medium having computer readable code thereon, the non-transitory computer readable medium including instructions for a computer system to perform operations comprising:
receiving a data stream from a device in a network;
determining a current configuration of the device based on the data stream;
remotely identifying a desired configuration state of the device;
receiving current configuration state data indicating the current configuration state of the device;
generating desired configuration instructions for use in locally configuring the device to operate at the desired configuration state based on the current configuration state of the device indicated by the current configuration state data and the desired configuration state of the device; and
locally arranging the device to operate at the desired configuration state using the desired configuration instructions based on a control and provisioning of wireless access points.

* * * * *